US012191106B2

(12) United States Patent
Torai

(10) Patent No.: US 12,191,106 B2
(45) Date of Patent: Jan. 7, 2025

(54) METHOD FOR MANUFACTURING INDUSTRIAL MAGNETRON

(71) Applicant: Hitachi Power Solutions Co., Ltd., Ibaraki (JP)

(72) Inventor: Reiji Torai, Ibaraki (JP)

(73) Assignee: HITACHI POWER SOLUTIONS CO., LTD., Ibaraki (JP)

( * ) Notice: Subject to any disclaimer, the term of this patent is extended or adjusted under 35 U.S.C. 154(b) by 0 days.

(21) Appl. No.: 18/407,788

(22) Filed: Jan. 9, 2024

(65) Prior Publication Data

US 2024/0242915 A1 Jul. 18, 2024

(30) Foreign Application Priority Data

Jan. 13, 2023 (JP) ................................ 2023-004067

(51) Int. Cl.
*H01J 23/00* (2006.01)
*H01J 25/50* (2006.01)

(52) U.S. Cl.
CPC ............ *H01J 23/005* (2013.01); *H01J 25/50* (2013.01)

(58) Field of Classification Search
CPC ................................ H01J 23/005; H01J 25/50
See application file for complete search history.

(56) References Cited

U.S. PATENT DOCUMENTS

2024/0242915 A1* 7/2024 Torai ........................ H01J 25/50

FOREIGN PATENT DOCUMENTS

JP 2003100224 A * 4/2003
JP 2016-207603 A 12/2016

OTHER PUBLICATIONS

English Machine Traslation of Ochiai JP 2003100224 (Year: 2024).*

* cited by examiner

*Primary Examiner* — Donald L Raleigh
(74) *Attorney, Agent, or Firm* — MATTINGLY & MALUR, PC

(57) ABSTRACT

Provided is, for an industrial magnetron having a large output, a method for manufacturing an industrial magnetron that can be continuously operated by effectively cooling an anode cylindrical body and a magnet and suppressing performance degradation and failure of the anode cylindrical body. The industrial magnetron includes the anode cylindrical body, annular permanent magnets that are arranged above and below the anode cylindrical body to supply a magnetic field, and a cooling block disposed in a columnar shape on the outer circumference of the anode cylindrical body. The cooling block has an anode cylindrical body contact portion, which is a portion in contact with the anode cylindrical body, and a permanent magnet contact portion, which is a portion in contact with the permanent magnets and both the anode cylindrical body and the permanent magnets are cooled by one cooling block.

11 Claims, 14 Drawing Sheets

METHOD FOR MANUFACTURING INDUSTRIAL MAGNETRON

CROSS-REFERENCE TO RELATED APPLICATION

The present application claims priority from Japanese application JP2023-004067, filed on Jan. 13, 2023, the content of which is hereby incorporated by reference into this application.

TECHNICAL FIELD

The present invention relates to a high-power industrial magnetron.

BACKGROUND ART

Generally, because an industrial magnetron is capable of efficiently generating a radio frequency output, same is widely used in the fields of radar devices, medical devices, cooking devices such as microwave ovens, semiconductor manufacturing devices, other microwave application devices, and other such fields. High-output microwaves are required for semiconductor devices and industrial heating.

A magnetron includes a high-voltage DC power supply that generates a high voltage to be applied between a cathode and an anode, a power supply that heats a filament for emitting electrons to a specified temperature, a control circuit for the power supplies, a waveguide for extracting microwave energy, and a housing that houses the foregoing components, and the like.

The magnetron includes a cathode disposed at the center of an anode cylindrical body (anode) and a magnet. A heater is wound around the cathode, and when a predetermined current is applied thereto, thermal electrons are emitted from the cathode. The thermal electrons are attracted to the anode cylindrical body side, but circulate around the cathode while rotating due to the magnetic field formed by the magnet, and this vibration is caused to resonate in a cavity provided on the anode side, and the energy is extracted from an output part (antenna) as radio waves (microwaves).

However, some of the thermal electrons collide with the anode cylindrical body, and heat is generated when the energy thereof is converted into heat. As the heat generation continues, the performance of the magnet is degraded, and the anode cylindrical body is damaged.

In the case of a magnetron having a small output used in a household microwave oven or the like, the amount of heat generation is also small, and therefore the heat generation can be handled by cooling the magnetron by using air cooling. However, an industrial magnetron having a large output cannot be cooled by air cooling, and needs to be cooled using a liquid medium such as water cooling.

Corresponding methods include a method in which a refrigerant pipe is disposed around a cooling block to supply a liquid refrigerant, and when it is necessary to further enhance the cooling capacity, a method in which the anode cylindrical body is forcibly cooled by a cooling block disposed around the anode cylindrical body to suppress heat generation. Specifically, a refrigerant flow path is provided in the cooling block so as to circulate around the anode cylindrical body, thus causing the liquid refrigerant to flow in the cooling block to directly cool the anode cylindrical body.

Patent Literature 1 discloses a magnetron that is an integral member having an annular shape in which both end portions of an annular continuous portion face each other, and includes a cooling block that is fastened to an outer circumferential surface of an anode cylindrical body so as to surround the anode cylindrical body, and contains a cooling-liquid circulation path to cool the anode cylindrical body.

CITATION LIST

Patent Literature

PTL 1: JP 2016-207603 A

SUMMARY OF INVENTION

Technical Problem

In the magnetron disclosed in Patent Literature 1, the anode cylindrical body can be effectively cooled. However, in the case of an industrial magnetron having a large output, heat generated by the anode cylindrical body is transmitted to the magnet, and the temperature of the magnet rises. In the case of an industrial magnetron having a large output, it has been found that the cooling capacity afforded by only cooling the anode cylindrical body is insufficient relative to the temperature rise of the magnet.

The present invention was conceived of in view of such circumstances, and it is an object of the present invention to provide, for an industrial magnetron having a large output, an industrial magnetron that can be continuously operated by effectively cooling an anode cylindrical body and a magnet and suppressing performance degradation and failure of the anode cylindrical body.

Solution to Problem

In order to solve the above problem, in a method for manufacturing an industrial magnetron of the present invention, the industrial magnetron comprises: an anode cylindrical body; an annular permanent magnet that is disposed above and below the anode cylindrical body and that supplies a magnetic field; and a cooling block that is disposed in a columnar shape on an outer circumference of the anode cylindrical body, wherein the cooling block has an anode cylindrical body contact portion that is in contact with the anode cylindrical body, and a permanent magnet contact portion that is in contact with the permanent magnet, and wherein, at the stage of manufacturing a sample, which is the stage prior to main production of the industrial magnetron in which both the anode cylindrical body and the permanent magnet are cooled by one cooling block, the industrial magnetron is subjected to a test operation to specify a heat generation position of the anode cylindrical body and measure the amount of heat generation thereof, and an arrangement position of a refrigerant flow path and the number of circuits of the refrigerant flow path are determined according to the heat generation position and the amount of heat generation.

Advantageous Effects of Invention

According to the present invention, it is possible to provide, for an industrial magnetron having a large output, an industrial magnetron that can be continuously operated by effectively cooling an anode cylindrical body and a magnet and suppressing performance degradation and failure of the anode cylindrical body.

DESCRIPTION OF EMBODIMENTS

Hereinafter, embodiments of the present invention will be described in detail with reference to the drawings.

First Embodiment

Figure 1A:
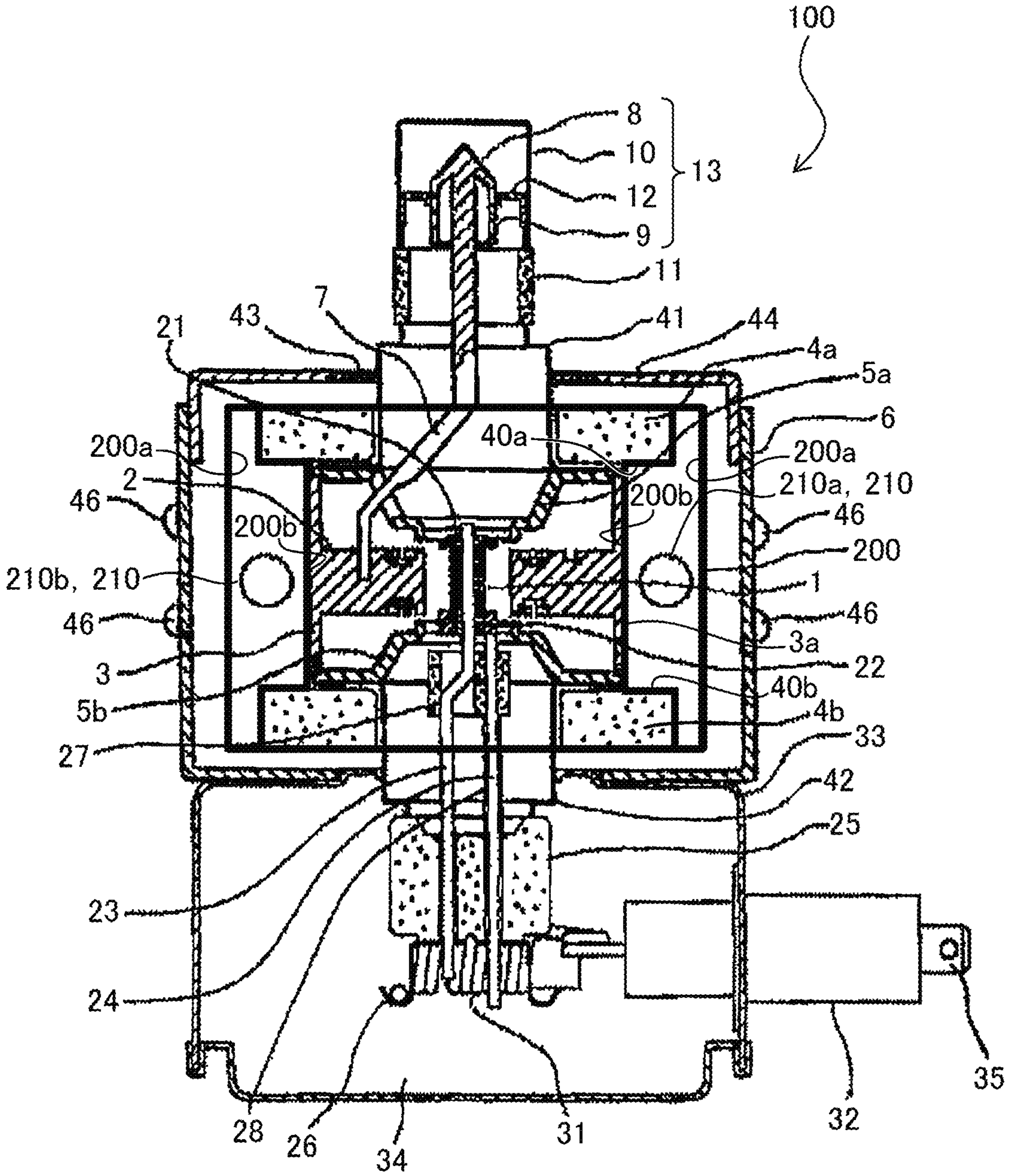
FIG. 1A is a longitudinal sectional view showing a configuration of an industrial magnetron according to a first embodiment of the present invention.
Figure 1B:
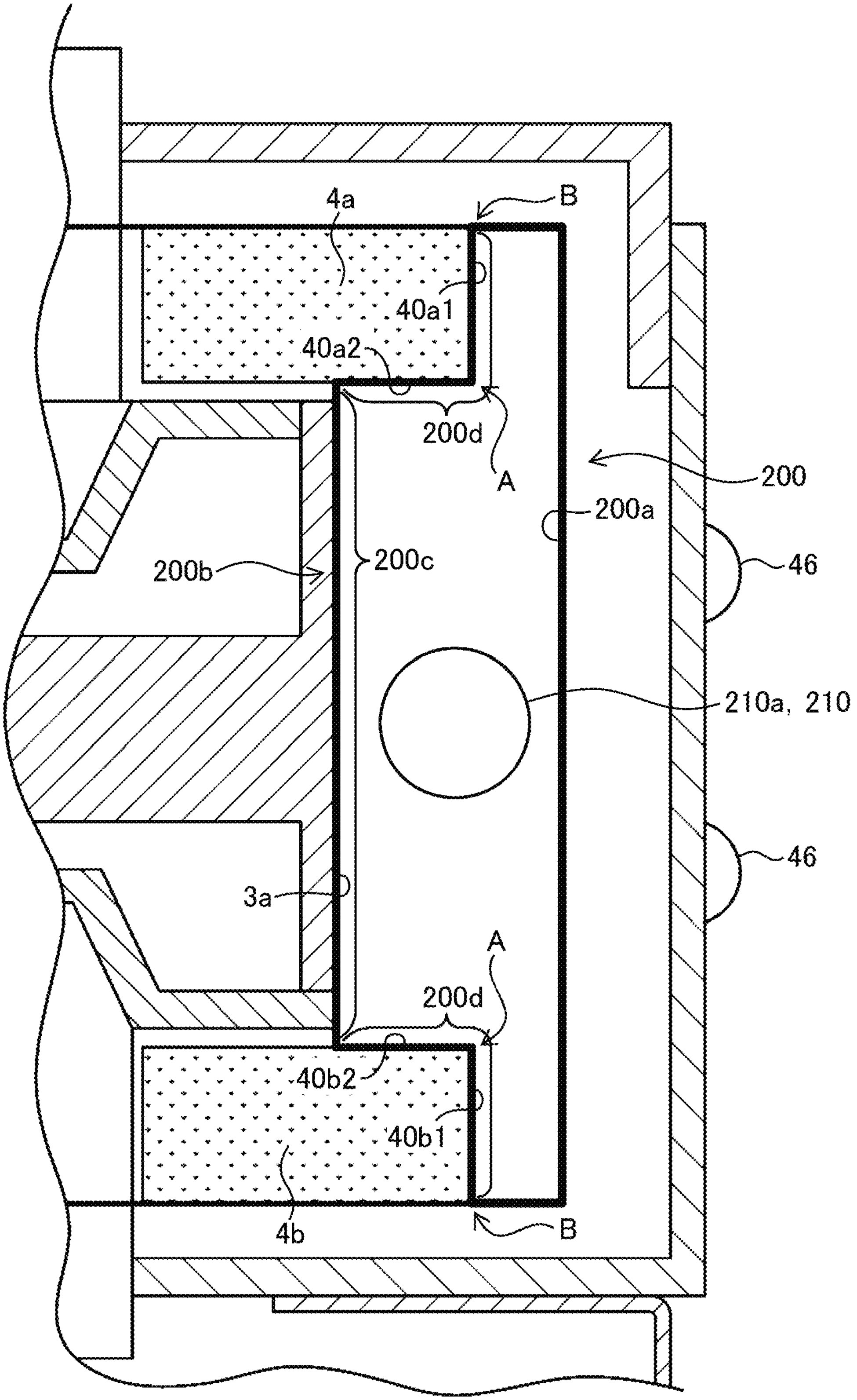
FIG. 1B is an enlarged view of the principal parts of FIG. 1A.

FIG. 1A is a longitudinal sectional view showing a configuration of an industrial magnetron according to a first embodiment of the present invention. FIG. 1B is an enlarged view of the principal parts of FIG. 1A. The present embodiment is an example in which the present invention is applied to an industrial magnetron that includes a refrigerant flow path that makes only one circuit of the anode cylindrical body.

Overall Configuration

As illustrated in FIG. 1A, an industrial magnetron 100 is a magnetron that ranges from the low-output type having an output of approximately 2 kW to the high-output type having an output of approximately 15 kW. In the case of a low-output type magnetron, sufficient cooling can be achieved even with a configuration in which the refrigerant makes one circuit of the refrigerant flow path.

The industrial magnetron 100 includes a cathode filament 1 formed into a helical shape as a heat emission source, a plurality of anode vanes 2 arranged around the cathode filament 1, an anode cylindrical body 3 (anode cylinder) supporting the anode vanes 2, and a pair of permanent magnets 4*a*, 4*b* having an annular shape and arranged at upper and lower ends of the anode cylindrical body 3. The anode vanes 2 and the anode cylinder 3 are integrated by fixing using brazing or the like or by an extrusion molding method, and constitute some of the anode portions.

Note that "circulate around" means "to circle around; to go around there; and around same; surroundings". However, in the present specification, as shown in FIG. 1A, even if a refrigerant flow path 210 does not turn by 360 degrees around the anode cylindrical body 3, the refrigerant flow path 210 goes around the anode cylindrical body 3, and therefore the aspect shown in FIG. 1A is also referred to as circulation (circulation around the anode cylindrical body). Incidentally, in the example of FIG. 1A, the number of circuits is one, and in the example of FIG. 8 to be described below, the number of circuits is three because a turn is made in two places.

The plurality of anode vanes 2 are arranged radially around the cathode filament 1. An active space is formed between the cathode filament 1 and the anode vanes 2. A region surrounded by the two adjacent anode vanes 2 and the anode cylinder 3 is a resonant cavity.

A pair of magnetic poles 5*a* and 5*b* made of a ferromagnetic material such as soft iron are disposed between the anode cylindrical body 3 and the permanent magnets 4*a* and 4*b*, respectively.

An antenna lead 7 is electrically connected to the anode vanes 2. The other end of the antenna lead 7 is sealed together with an exhaust pipe 8. The antenna lead 7 and the exhaust pipe 8 are electrically connected to each other. The exhaust pipe 8 also constitutes a magnetron antenna 13 together with a choke 9, an antenna cover 10, and an exhaust pipe support 12. The magnetron antenna 13 is supported by a cylindrical insulator 11.

The cathode filament 1 is connected to a center lead 23 and a side lead 24, which are cathode leads. In addition, an upper end shield 21, a lower end shield 22, an input-side ceramic 25, a cathode terminal 26, and a spacer 27 are arranged around the cathode filament 1. The spacer 27 has a function for preventing disconnection of the cathode filament 1. The spacer 27 is fixed in a predetermined position by the sleeve 28. These components constitute cathode parts. The vanes 2 are arranged around the cathode parts.

A choke coil 31 is connected to one end of a feedthrough capacitor 32. The feedthrough capacitor 32 is attached to a filter case 33 of an input part. A cathode heating conductive wire 35 is provided at the other end of the feedthrough capacitor 32, and is connected to a power supply via the cathode heating conductive wire.

The bottom portion of the filter case 33 is closed by a lid body 34 in terms of radio frequency. Cap-shaped upper and lower end sealing metals 41 and 42 and a metal gasket 43 are electrically connected to an upper yoke 44.

The industrial magnetron 100 includes a cathode disposed at the center of an anode cylindrical body (anode) and a magnet. A heater is wound around the cathode, and when a predetermined current is applied thereto, thermal electrons are emitted from the cathode. The thermal electrons are attracted to the anode cylindrical body side, but circulate around the cathode while rotating due to the magnetic field formed by the magnet, and this vibration is caused to resonate in a cavity provided on the anode side, and the energy is extracted from an output part (antenna) as radio waves (microwaves).

The industrial magnetron 100 includes an anode cylindrical body 3, annular permanent magnets 4*a*, 4*b* arranged above and below the anode cylindrical body 3 to supply a magnetic field, and a cooling block 200 disposed in a columnar shape on the outer circumference of the anode cylindrical body 3.

The present embodiment further improves the structure in which the refrigerant flow path 210 is provided in the cooling block 200 to directly cool the anode cylindrical body. In the present specification, “to directly cool” means cooling by causing a refrigerant to flow at a predetermined distance around the anode cylindrical body.

Cooling Block 200

The cooling block 200 has an outer wall portion 200*a* of the cooling block body, and an inner wall surface 200*b* that is in close contact with a side wall surface 3*a* of the anode cylindrical body 3 in a cooling block center portion and that is in contact with outer wall surfaces 40*a* and 40*b* of the permanent magnets 4*a* and 4*b*.

Specifically, as shown in FIG. 1B, the cooling block 200 has an anode cylindrical body contact portion 200*c*, which is a portion in contact with the anode cylindrical body 3, and a permanent magnet contact portion 200*d*, which is a portion in contact with the permanent magnets 4*a*, 4*b*, and both the anode cylindrical body 3 and the permanent magnets 4*a*, 4*b* are both cooled by one cooling block.

The anode cylindrical body contact portion 200*c* is a cylindrical portion of the inner wall surface 200*b* of the cooling block 200 which is in close contact with the side wall surface 3*a* of the anode cylindrical body 3.

The permanent magnet contact portion 200*d* is a portion of the inner wall surface 200*b* of the cooling block 200 where both surfaces of corner portions A of the outer wall surfaces 40*a* and 40*b* of the permanent magnets 4*a* and 4*b* are in contact.

In the present embodiment, the anode cylindrical body contact portion 200*c* and the permanent magnet contact portion 200*d* are both formed on the inner wall surface 200*b* of the cooling block 200, but any cooling block 200 may be used as long as same has the anode cylindrical body contact portion 200*c* in contact with the anode cylindrical body 3 and the permanent magnet contact portion 200*d* in contact with the permanent magnets 4*a* and 4*b*. For example, the anode cylindrical body contact portion 200*c* may cover at least part of the side wall surface 3*a* of the anode cylindrical body 3.

In the present embodiment, the permanent magnet contact portion 200*d* is in contact with the corner portions A of the outer wall surfaces 40*a* and 40*b* of the permanent magnets 4*a* and 4*b*, that is, with the two surfaces of outer circumferential surfaces 40*a*1 and 40*b*1 of the ring-shaped permanent magnets 4*a* and 4*b* and of opposing surfaces 40*a*2 and 40*b*2 of the permanent magnets 4*a* and 4*b* connected to the outer circumferential surfaces 40*a*1 and 40*b*1. As a result, the permanent magnet contact portion 200*d* of the cooling block 200 comes into contact, via two surfaces, with the corner portions A of the outer wall surfaces 40*a* and 40*b* of the permanent magnets 4*a* and 4*b*, thus enabling the permanent magnets 4*a* and 4*b* to be effectively cooled. In this case, the permanent magnet contact portion 200*d* may be configured to contact one of the outer circumferential surfaces 40*a*1 and 40*b*1 or the opposing surfaces 40*a*2 and 40*b*2. Further, the permanent magnet contact portion 200*d* may be configured to wrap the outer circumferential portions of the permanent magnets 4*a* and 4*b* around the other corners B facing the corner portions A of the outer circumferential surfaces 40*a*1 and 40*b*1.

As described above, the cooling block 200 includes the anode cylindrical body contact portion 200*c* and the permanent magnet contact portion 200*d*, and the anode cylindrical body contact portion 200*c* is brought into close contact with the side wall surface 3*a* of the anode cylindrical body 3, while the permanent magnet contact portion 200*d* is brought into contact with the outer wall surfaces 40*a*, 40*b* of the permanent magnets 4*a*, 4*b*. The cooling block 200 is configured such that the anode cylindrical body 3 and permanent magnets 4*a*, 4*b* are simultaneously cooled by one cooling block by covering the anode cylindrical body 3 and the permanent magnets 4*a*, 4*b* with the inner wall surface 200*b*.

Note that the outer wall portion 200*a* of the cooling block 200 may have a function as a yoke of the permanent magnets 4*a* and 4*b*.

In the cooling block 200, the refrigerant flow path 210 through which the liquid refrigerant flows is disposed in the cooling block 200 in order to further increase the cooling capacity. That is, the cooling block 200 is provided with the refrigerant flow path 210 through which the liquid refrigerant flows so as to circulate around the anode cylindrical body 3 to directly cool the anode cylindrical body 3.

The cooling block 200 has the refrigerant flow path 210 that makes at least one circuit of the anode cylindrical body 3, and adjusts the capacity for cooling the anode cylindrical body 3 depending on the position in which the refrigerant flow path 210 circulates.

The anode cylindrical body contact portion 200*c* on the inner wall surface 200*b* (inner circumferential surface side) of the cooling block 200 is disposed in close contact with the side wall surface 3*a* of anode cylindrical body 3. At this time, the permanent magnet contact portion 200*d* on the inner wall surface 200*b* (permanent magnet side) of the cooling block 200 comes into contact with the outer wall surfaces 40*a* and 40*b* of the permanent magnets 4*a* and 4*b*. As a result, the cooling block 200 has a structure in which the anode cylindrical body 3 and the permanent magnets 4*a*, 4*b* are both cooled by one cooling block as the anode cylindrical body contact portion 200*c* is brought into close contact with the side wall surface 3*a* of the anode cylindrical body 3 and the permanent magnet contact portion 200*d* is also brought into contact with outer wall surfaces 40*a*, 40*b* of the permanent magnets 4*a*, 4*b*.

The cooling block 200 is disposed on an outer circumferential portion of the anode cylindrical body 3 of the industrial magnetron 100, and is formed in a columnar shape. Note that, in manufacturing and processing, a quadrangular column is adopted for the cooling block 200.

The cooling block 200 is made of an aluminum material (Al) having high thermal conductivity and high workability. The refrigerant flow path 210 through which the refrigerant medium (refrigerant) flows is provided inside the cooling block 200.

The cooling block 200 is fixed to the yoke 6 with a plurality of mounting screws 46. Note that the cooling block 200 may be formed of a copper material (Cu) instead of the aluminum material.

As the refrigerant, normally water, particularly pure water or ion-exchanged water, is preferably used. The refrigerant may be a coolant (an aqueous solution containing ethylene glycol) or the like.

Figure 2:
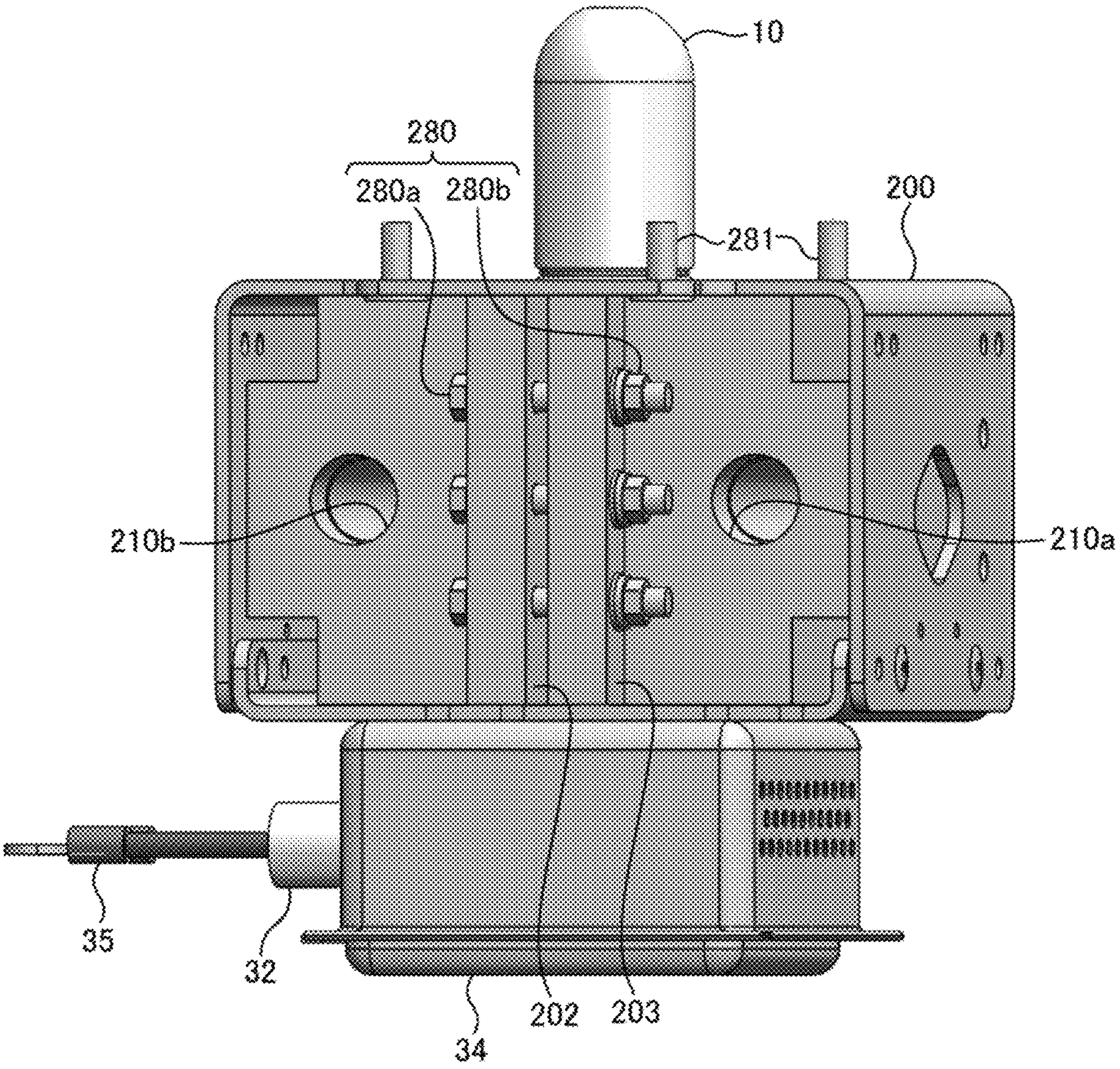
FIG. 2 is a perspective view showing a structure of a cooling block of the industrial magnetron according to the first embodiment of the present invention.

FIG. 2 is a perspective view illustrating a structure of the cooling block 200.

As shown in FIG. 2, the cooling block 200 has a quadrangular column shape, and includes an anode cylindrical body insertion portion 201 (space or through-hole) (FIG. 3), a slit 202 (gap), and a protrusion 203 provided on both sides of the slit 202. The anode cylindrical body 3 (FIG. 1A) is inserted into the cooling block 200 from the anode cylindrical body insertion portion 201 (FIG. 3), and an outer circumferential wall of the anode cylindrical body 3 is brought into close contact with an inner wall surface of the cooling block 200. After the anode cylindrical body 3 (FIG. 1A) is disposed in the cooling block 200, both ends of the protrusion 203 are fixed by being screwed using a bolt 280*a* and a nut 280*b*. Note that the bolt 280*a* and the nut 280*b* constitute fastening means 280.

Figure 3:
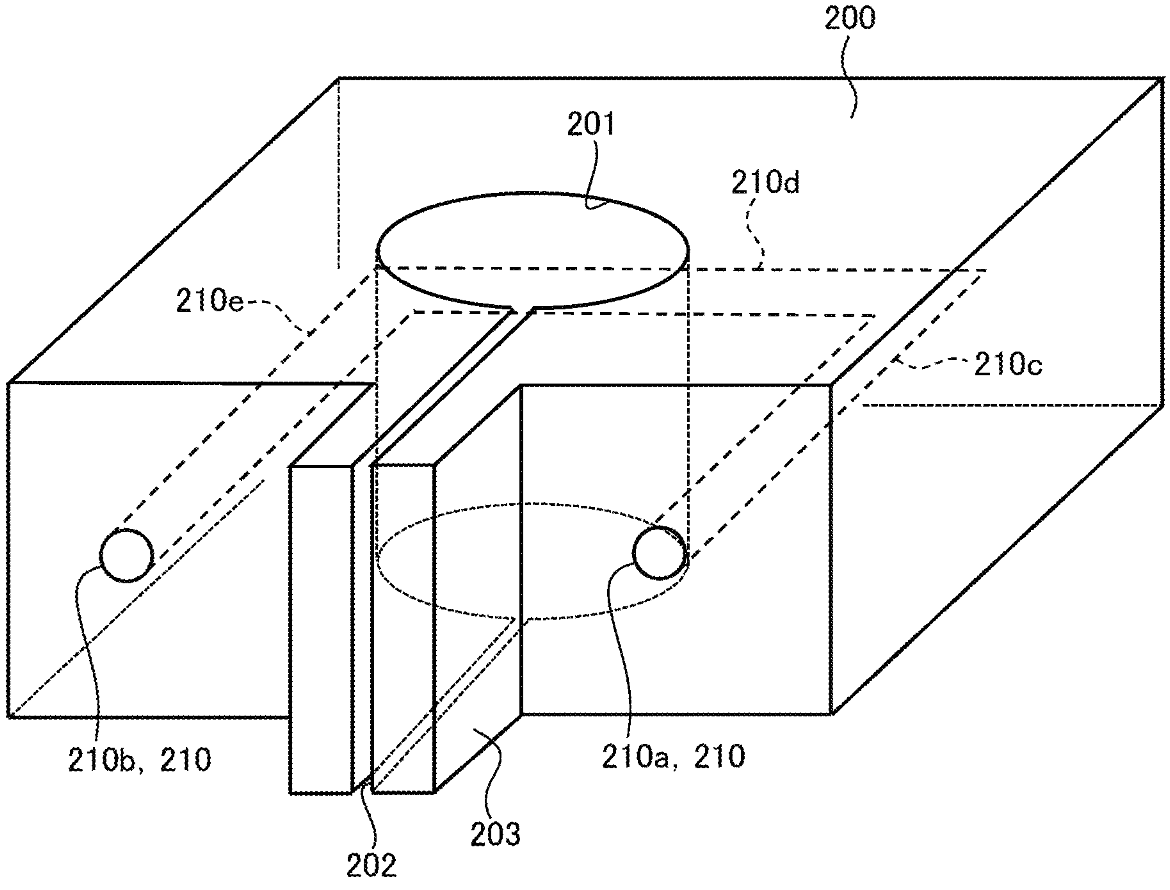
FIG. 3 is a perspective view showing a configuration of a cooling block having a one-stage refrigerant flow path that makes one circuit of the anode cylindrical body of the industrial magnetron according to the first embodiment of the present invention.

FIG. 3 is a perspective view showing a configuration of a cooling block 200 having a one-stage refrigerant flow path 210 that makes one circuit of the anode cylindrical body 3.

As shown in FIG. 3, the cooling block 200 is a quadrangular column-shaped aluminum material, and has an anode cylindrical body insertion portion 201 and a slit 202 (gap).

The protrusions 203 provided on both sides of the slit 202 are provided for tightening the bolt in order to bring the outer circumferential wall of the anode cylindrical body 3 into close contact with the cooling block 200.

Note that the cooling block 200 may be a columnar body having another cross-sectional shape (for example, a circle), but is desirably a quadrangular column-shaped body because manufacturing which includes processing such as drilling is then straightforward.

In the following description, for the sake of convenience, the direction of the center axis of the columnar body, that is, the center axis of the anode cylindrical body insertion portion 201, is referred to as the "vertical direction". However, this is merely a convenient expression, and, depending on the method of installing the cooling block 200, the center axis may be in the horizontal direction with respect to the direction of gravity or in the oblique direction relative to the vertical direction.

Refrigerant Flow Path 210

Arrangement of Refrigerant Flow Path 210

The refrigerant flow path 210 causes the liquid refrigerant to flow so as to circulate around the anode cylindrical body 3 to directly cool the anode cylindrical body 3.

The refrigerant flow path 210 is disposed in a U-shape so as to circulate around the outer circumferential surface of the anode cylindrical body 3 inside a quadrangular column-shaped cooling block 200.

One end of the refrigerant flow path 210 is an opening and is used as a connection port 210*a* for connecting to a refrigerant storage tank (not illustrated) disposed outside, and the other end of the refrigerant flow path 210 is a connection port 210*b* and is used as a connection port 210*b* for connecting to the refrigerant storage tank. The connection port 210*a* and the connection port 210*b* are provided on the same side surface of the quadrangular column-shaped cooling block 200. In operation, a supply path (not illustrated) for supplying the liquid refrigerant from a refrigerant storage tank or the like for supplying the liquid refrigerant is connected to an introduction port (the connection port 210*a*), and a recovery path (not illustrated) for recovering the liquid refrigerant to the refrigerant storage tank or the like is connected to a discharge port (the connection port 210*b*).

Arrangement Position of Refrigerant Flow Path that Makes Only One Circuit

It can be seen that, by disposing the refrigerant flow path 210 to circulate around the portion of the anode cylindrical body 3 having the largest amount of heat generation, the cooling capacity of the refrigerant flow path 210 relative to the anode cylindrical body 3 can be maximized.

FIGS. 4A to 4D are diagrams schematically showing arrangement positions of a refrigerant flow path that makes one circuit.

Figure 4A:
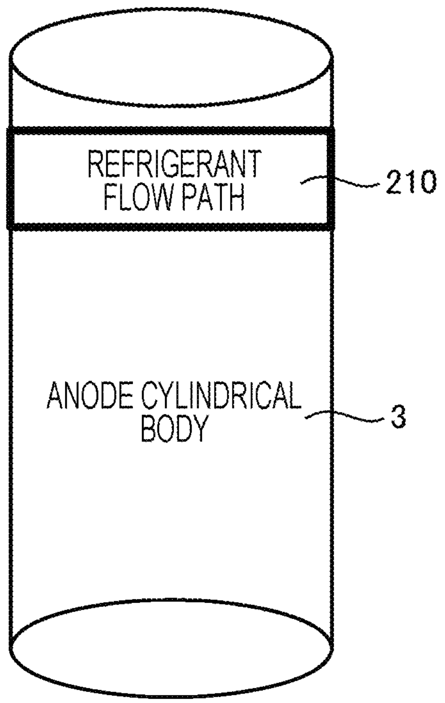
FIG. 4A is a diagram schematically showing an arrangement position of a refrigerant flow path of the industrial magnetron according to the first embodiment of the present invention.

In FIG. 4A, a maximum heat generation part is distributed to the upper part of the anode cylindrical body 3, and the refrigerant flow path 210 is made to circulate around the upper part of the anode cylindrical body 3.

Figure 4B:
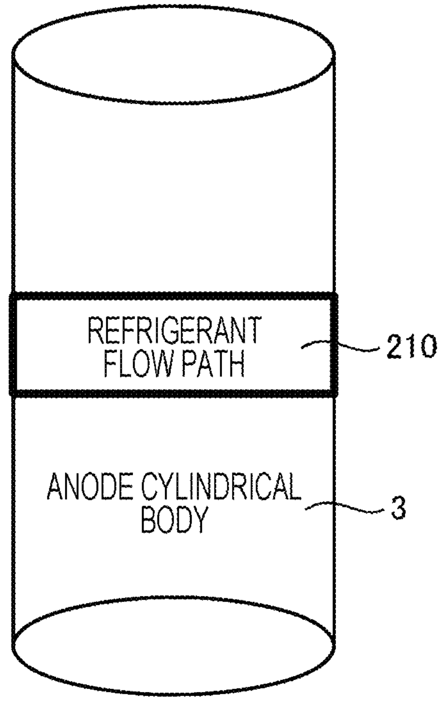
FIG. 4B is a diagram schematically showing an arrangement position of the refrigerant flow path of the industrial magnetron according to the first embodiment of the present invention.

In FIG. 4B, the maximum heat generation part is distributed to the central part of the anode cylindrical body 3, and the refrigerant flow path 210 is made to circulate around the central part of the anode cylindrical body 3.

Figure 4C:
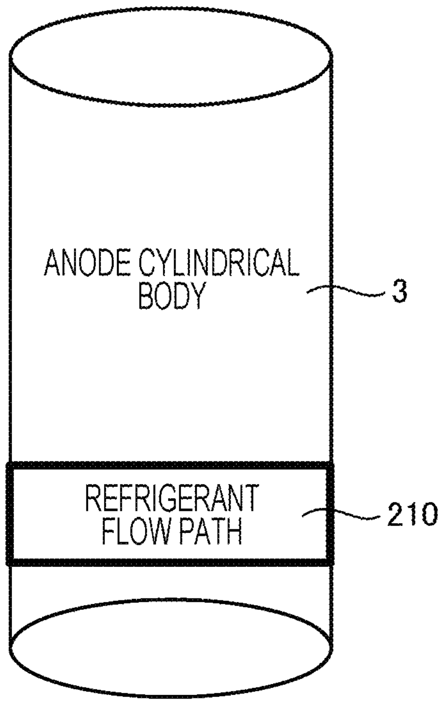
FIG. 4C is a diagram schematically showing an arrangement position of the refrigerant flow path of the industrial magnetron according to the first embodiment of the present invention.

In FIG. 4C, the maximum heat generation part is distributed to the lower part of the anode cylindrical body 3, and the refrigerant flow path 210 is made to circulate around the lower part of the anode cylindrical body 3.

Figure 4D:
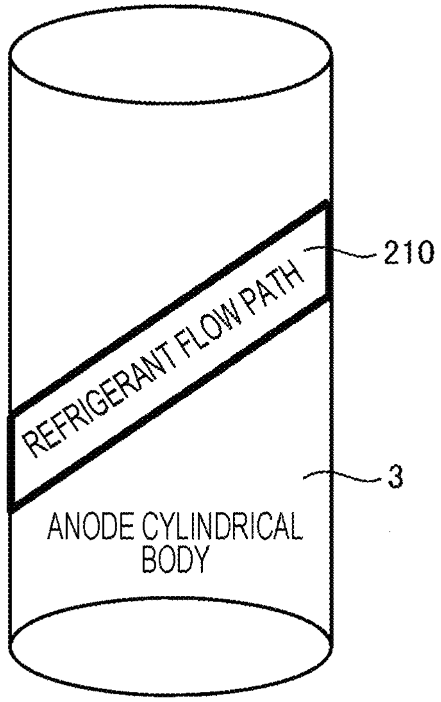
FIG. 4D is a diagram schematically showing an arrangement position of the refrigerant flow path of the industrial magnetron according to the first embodiment of the present invention.

In FIG. 4D, the maximum heat generation part is obliquely distributed to the anode cylindrical body 3, and the refrigerant flow path 210 is made to circulate obliquely relative to the anode cylindrical body 3.

As described above, the capacity for cooling the anode cylindrical body 3 can be adjusted by the position of the refrigerant flow path 210 circulating around the anode cylindrical body 3.

Advantageous Effects of First Embodiment

As described above, the industrial magnetron 100 (FIG. 1A) according to the first embodiment is the industrial magnetron 100, which includes the anode cylindrical body 3, the annular permanent magnets 4*a* and 4*b* that are arranged above and below the anode cylindrical body 3 to supply a magnetic field, and the cooling block 200 disposed in a columnar shape on the outer circumference of the anode cylindrical body 3. The cooling block 200 has the anode cylindrical body contact portion 200*c*, which is a portion in contact with the anode cylindrical body 3 and the permanent magnet contact portion 200*d*, which is a portion in contact with the permanent magnets 4*a* and 4*b*, and both the anode cylindrical body 3 and the permanent magnets 4*a*, 4*b* are cooled by one cooling block.

The magnetron disclosed in Patent Literature 1 includes a "cooling block which is fastened to the outer circumferential surface of the anode cylindrical body so as to surround the anode cylindrical body, and contains a cooling-liquid circulation path to cool the anode cylindrical body". Thus, the cooling block is a structure for directly cooling only the anode cylinder. However, in the case of an industrial magnetron having a large output, it has been found that the cooling capacity afforded by only cooling the anode cylindrical body is insufficient relative to the temperature rise of the magnet.

Therefore, in the industrial magnetron 100 according to the present embodiment, the cooling block 200 covers at least some of the anode cylindrical body 3 and the permanent magnets 4*a*, 4*b*, and cools both the anode cylindrical body 3 and the permanent magnets 4*a*, 4*b*. Due to this configuration, in an industrial magnetron having a large output, even in a case where the heat generated by the anode cylindrical body 3 is transmitted to the permanent magnets 4*a*, 4*b* and the temperature of the permanent magnets 4*a*, 4*b* rises, the cooling block 200 is capable of simultaneously cooling the anode cylindrical body 3 and the permanent magnets 4*a*, 4*b* by one cooling block by bringing the anode cylindrical body contact portion 200*c* of the inner wall surface 200*b* into close contact with the side wall surface 3*a* of the anode cylindrical body 3 and by bringing the permanent magnet contact portion 200*d* into contact with the outer wall surfaces 40*a*, 40*b* of the permanent magnets 4*a*, 4*b*. Accordingly, heat transfer from the anode cylindrical body 3 to the permanent magnets 4*a*, 4*b* is suppressed, and thus a temperature change is not generated in the permanent magnets 4*a*, 4*b*. Therefore, the anode cylindrical body 3 and the permanent magnets 4*a*, 4*b* can be effectively cooled, and continuous operation can be performed while performance degradation and failure of the anode cylindrical body are suppressed. As a result, it is possible to provide an industrial magnetron in which the influence of heat generation is suppressed even when the industrial magnetron is operated in a high-output range of 2 kW to 15 kW.

In the industrial magnetron 100 (FIG. 1A), the cooling block 200 has an inner wall surface 200*b* in close contact with the side wall surface 3*a* of the anode cylindrical body 3. The anode cylindrical body contact portion 200*c* of the inner wall surface 200*b* is in close contact with the side wall surface 3*a* of the anode cylindrical body 3, and the permanent magnet contact portion 200*d* is in contact with the outer wall surfaces 40*a*, 40*b* of the permanent magnets 4*a*, 4*b*.

Due to this configuration, the permanent magnets 4*a* and 4*b* are capable of dissipating the heat transferred from the anode cylindrical body 3 to the permanent magnet contact portion 200*d* of the cooling block 200 and the main body of the cooling block 200 via the outer circumferential surfaces 40*a*1 and 40*b*1 and the opposing surfaces 40*a*2 and 40*b* of the outer wall surfaces 40*a* and 40*b* of the permanent magnets 4*a* and 4*b*, thereby effectively cooling the anode cylindrical body 3 and the permanent magnets 4*a* and 4*b*.

Incidentally, the cooling block of the magnetron disclosed in Patent Literature 1 has a structure for cooling only the side wall surface of the anode cylindrical body, and thus does not have a structure in which the inner wall surface 200*b* (permanent magnet side) of the cooling block 200 is in contact with the outer wall surfaces 40*a* and 40*b* of the permanent magnets 4*a* and 4*b* as per the cooling block 200 according to the present embodiment. Therefore, as per the present embodiment, the heat transferred from the anode cylindrical body 3 to the permanent magnets 4*a* and 4*b* is dissipated to the main body of the cooling block 200 through the outer circumferential surfaces 40*a*1 and 40*b*1 and the opposing surfaces 40*a*2 and 40*b* of the outer wall surfaces 40*a* and 40*b* of the permanent magnets 4*a* and 4*b* and the permanent magnet contact portion 200*d* of the cooling block 200, and therefore the specific advantageous effect of effectively cooling both the anode cylindrical body 3 and the permanent magnets 4*a* and 4*b* is not obtained.

In the industrial magnetron 100 (FIG. 1A), the cooling block 200 includes a refrigerant flow path 210 that causes the liquid refrigerant to flow so as to circulate around the anode cylindrical body 3 to directly cool the anode cylindrical body 3.

Due to this configuration, the cooling block 200 is capable of further increasing the cooling capacity by means of the refrigerant flow path 210. Because the cooling capacity of the cooling block 200 is enhanced, the anode cylindrical body 3 and the permanent magnets 4*a* and 4*b* can be more effectively cooled.

In the industrial magnetron 100 (FIG. 1A), the cooling block 200 includes the refrigerant flow path 210 that circulates at least once around the anode cylindrical body 3, and the capacity for cooling the anode cylindrical body 3 is adjusted by the position in which the refrigerant flow path 210 circulates.

In addition, at the stage of manufacturing a sample, which is the stage prior to main production of the industrial magnetron 100, the industrial magnetron 100 is subjected to a test operation to specify a heat generation position of the anode cylindrical body 3 and measure the amount of heat generation thereof, and the arrangement position of the refrigerant flow path 210 and the number of circuits of the refrigerant flow path 210 are set according to the heat generation position and the amount of heat generation.

Thus, the capacity for cooling the anode cylindrical body 3 can be adjusted by the arrangement position of the refrigerant flow path which circulates around the anode cylindrical body 3 and the number of circuits of the refrigerant flow path 210. That is, irrespective of the output of an industrial magnetron, at the stage of manufacturing a sample, which is the stage prior to main production of the industrial magnetron 100, the industrial magnetron 100 is subjected to a test operation to specify the heat generation position of the anode cylindrical body 3, measure the amount of heat generation, and the arrangement position of the refrigerant flow path 210 is set according to the heat generation position and the amount of heat generation thereof, and therefore the industrial magnetron 100 is capable of handling even changes in output, changes in application conditions or replacement (exchange) in the future, and thus versatility can be remarkably improved.

Second Embodiment

A configuration of a refrigerant flow path corresponding to a case where the cooling capacity afforded by one circuit is insufficient will be described.

Figure 5:
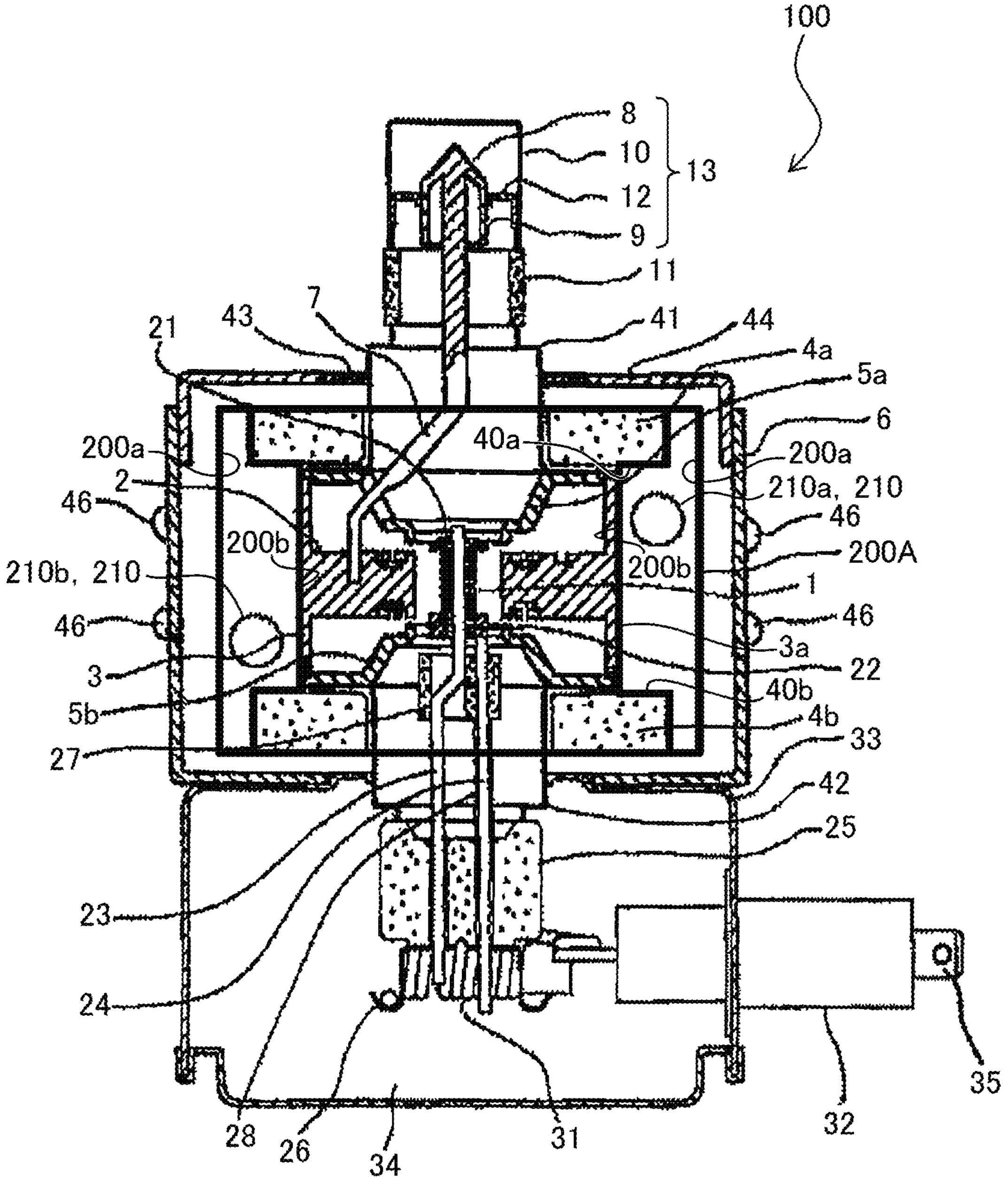
FIG. 5 is a longitudinal sectional view showing a configuration of an industrial magnetron according to a second embodiment of the present invention.

FIG. 5 is a longitudinal sectional view showing a configuration of an industrial magnetron according to a second embodiment of the present invention. The present embodiment is an example in which the present invention is applied to an industrial magnetron that includes a refrigerant flow path that circulates a plurality of times around the anode cylindrical body. The same components as those in FIG. 1A are denoted by the same reference signs, and a description of duplicate parts is omitted.

The cooling block 200A of the industrial magnetron 100 shown in FIG. 5 includes a refrigerant flow path 210 that circulates the anode cylindrical body 3 a plurality of times.

Figure 6:
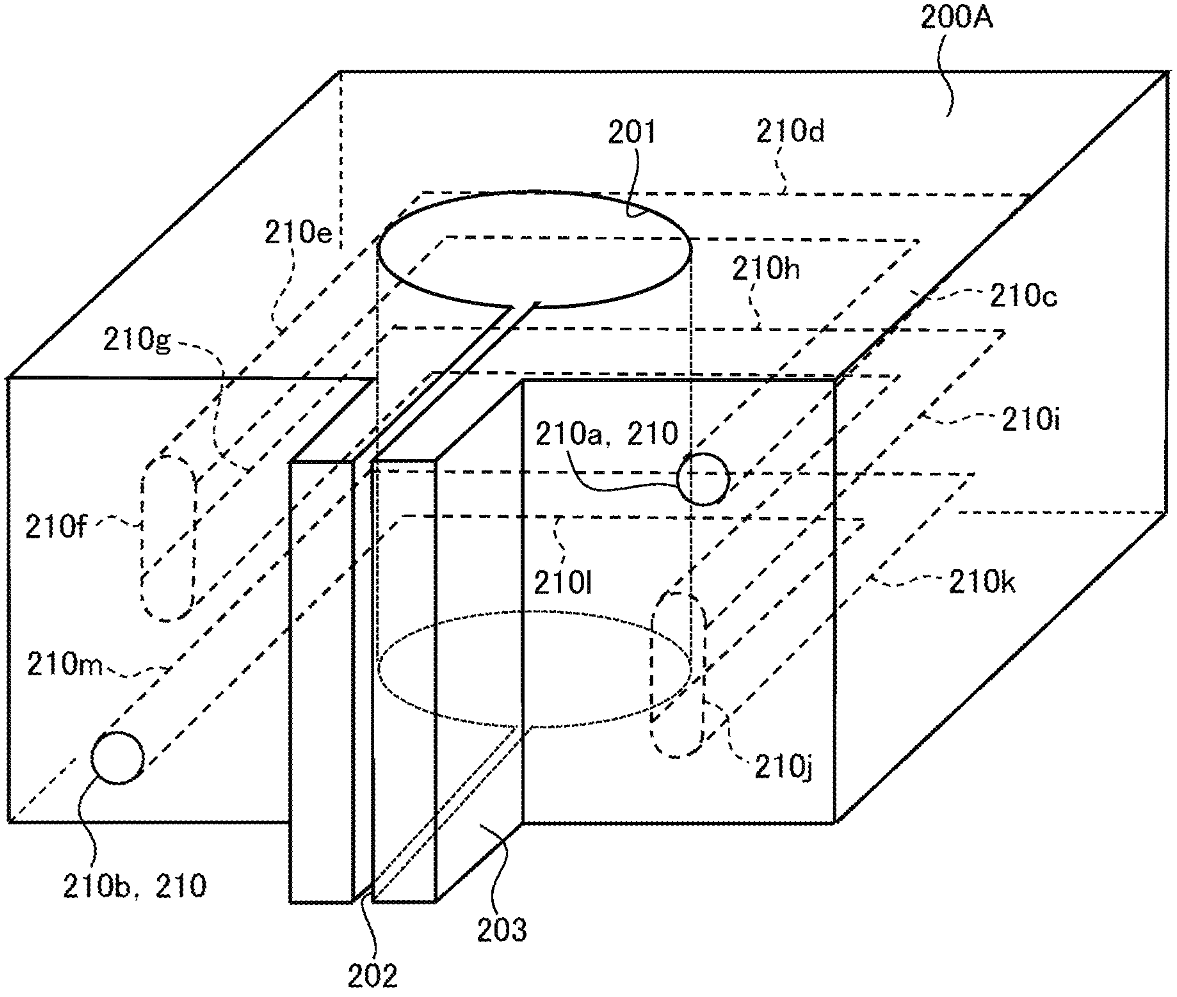
FIG. 6 is a perspective view showing a configuration of a cooling block having a refrigerant flow path that circulates a plurality of times around the anode cylindrical body of the industrial magnetron according to the second embodiment of the present invention.

FIG. 6 is a perspective view showing a configuration of a cooling block 200A having a refrigerant flow path 210 that circulates a plurality of times around the anode cylindrical body. The same components as those in FIG. 2 are denoted by the same reference signs, and a description of duplicate parts is omitted.

As illustrated in FIG. 6, the cooling block 200A contains two or more flow paths through which the refrigerant flows to different positions in the vertical direction. The different positions in the vertical direction have upper and lower positional relationships where an uppermost position is an upper position, the lowermost position is a lower position, and a position midway therebetween is an intermediate position.

The cooling block 200A contains two or more refrigerant flow paths 210 through which the refrigerant is made to flow, in different positions in the vertical direction, and adjusts the capacity for cooling the anode cylindrical body 3 in accordance with the positions in which the refrigerant flow paths 210 are arranged and/or the number of circuits of the refrigerant flow paths 210.

The cooling block 200A includes the refrigerant flow paths 210 (upper flow paths 210*c*, 210*d*, and 210*e*, intermediate flow paths (hereinafter, the flow paths are also referred to as "intermediate flow paths") 210*g*, 210*h*, and 210*i*, lower flow paths 210*k*, 210*l*, and 210*m*, and connecting flow paths 210*f* and 210*j*), and there is a three-stage flow path arrangement of the upper flow paths 210*c*, 210*d*, and 210*e*, the intermediate flow paths 210*g*, 210*h*, and 210*i*, and the lower flow paths 210*k*, 210*l*, and 210*m*.

The cooling block 200A contains the upper flow paths 210*c*, 210*d*, and 210*e*, the intermediate flow paths 210*g*, 210*h*, and 210*i*, and the lower flow paths 210*k*, 210*l*, and 210*m* in different positions (heights) in the vertical direction.

The upper flow paths 210*c*, 210*d*, and 210*e* and the intermediate flow paths 210*g*, 210*h*, and 210*i* are connected by providing the connecting flow path 210*f*, and the intermediate flow paths 210*g*, 210*h*, and 210*i* and the lower flow paths 210*k*, 210*l*, and 210*m* are connected by providing the connecting flow path 210*j*. The connecting flow path 210*f* is desirably arranged in the vertical direction such that the upper flow path 210*e* and the intermediate flow path 210*g* are connected at the shortest distance, that is, the connecting flow path 210*f* is orthogonal to both the upper flow path and the intermediate flow path. Similarly, the connecting flow path 210*j* is desirably arranged in the vertical direction such that the intermediate flow path 210*i* and the lower flow path 210*k* are at the shortest distance, that is, both the intermediate flow path and the lower flow path are orthogonal to each other. However, the orientations of the connecting flow paths 210*f* and 210*j* are not limited to the foregoing orientations, rather, the connecting flow paths 210*f* and 210*j* may be arranged obliquely with respect to the vertical direction.

Therefore, in the cooling block 200A, the upper flow paths 210*c*, 210*d*, and 210*e*, the intermediate flow paths 210*g*, 210*h*, and 210*i*, and the lower flow paths 210*k*, 210*l*, and 210*m* are connected in series by the connecting flow paths 210*f* and 210*j* to constitute one flow path.

The upper flow paths 210*c*, 210*d*, and 210*e*, the intermediate flow paths 210*g*, 210*h*, and 210*i*, and the lower flow paths 210*k*, 210*l*, and 210*m* are formed in a U shape such that the center axes of the respective flow paths are located on the same horizontal plane. That is, the upper flow paths 210*c*, 210*d*, and 210*e*, the intermediate flow paths 210*g*, 210*h*, and 210*i*, and the lower flow paths 210*k*, 210*l*, and 210*m* are arranged in a U shape so as to circulate around the outer circumferential surface of the anode cylindrical body 3 (FIG. 7), and the respective flow paths are arranged at predetermined intervals in the vertical direction. The upper flow paths 210*c*, 210*d*, and 210*e*, the intermediate flow paths 210*g*, 210*h*, and 210*i*, and the lower flow paths 210*k*, 210*l*, and 210*m* are desirably arranged such that the respective U-shapes overlap when the cooling block 200A is viewed from above.

The upper flow path 210*c* has a connection port 210*a* which is an end (opening), and the lower flow path 210*m* has a connection port 210*b* which is an end (opening). The connection port 210*a* of the upper flow path 210*c* and the connection port 210*b* of the lower flow path 210*m* are arranged on the same side surface side of the cooling block 200A. The connection port 210*a* of the upper flow path 210*c* and the connection port 210*b* of the lower flow path 210*m* are used as connection ports for connection to a refrigerant storage tank (not shown) disposed outside.

As described above, in the configuration of the refrigerant flow path 210 that circulates a plurality of times, the capacity for cooling the anode cylindrical body 3 can be adjusted by the arrangement positions of the uppermost refrigerant flow paths (upper flow paths 210*c*, 210*d*, 210*e*), the lowermost refrigerant flow paths (lower flow paths 210*k*, 210*l*, 210*m*), and the intermediate refrigerant flow paths (intermediate flow paths 210*g*, 210*h*, 210*i*), or the number of circuits of the intermediate refrigerant flow paths (the intermediate flow paths 210*g*, 210*h*, 210*i*).

Processing and Formation of Refrigerant Flow Path 210

Figure 7:
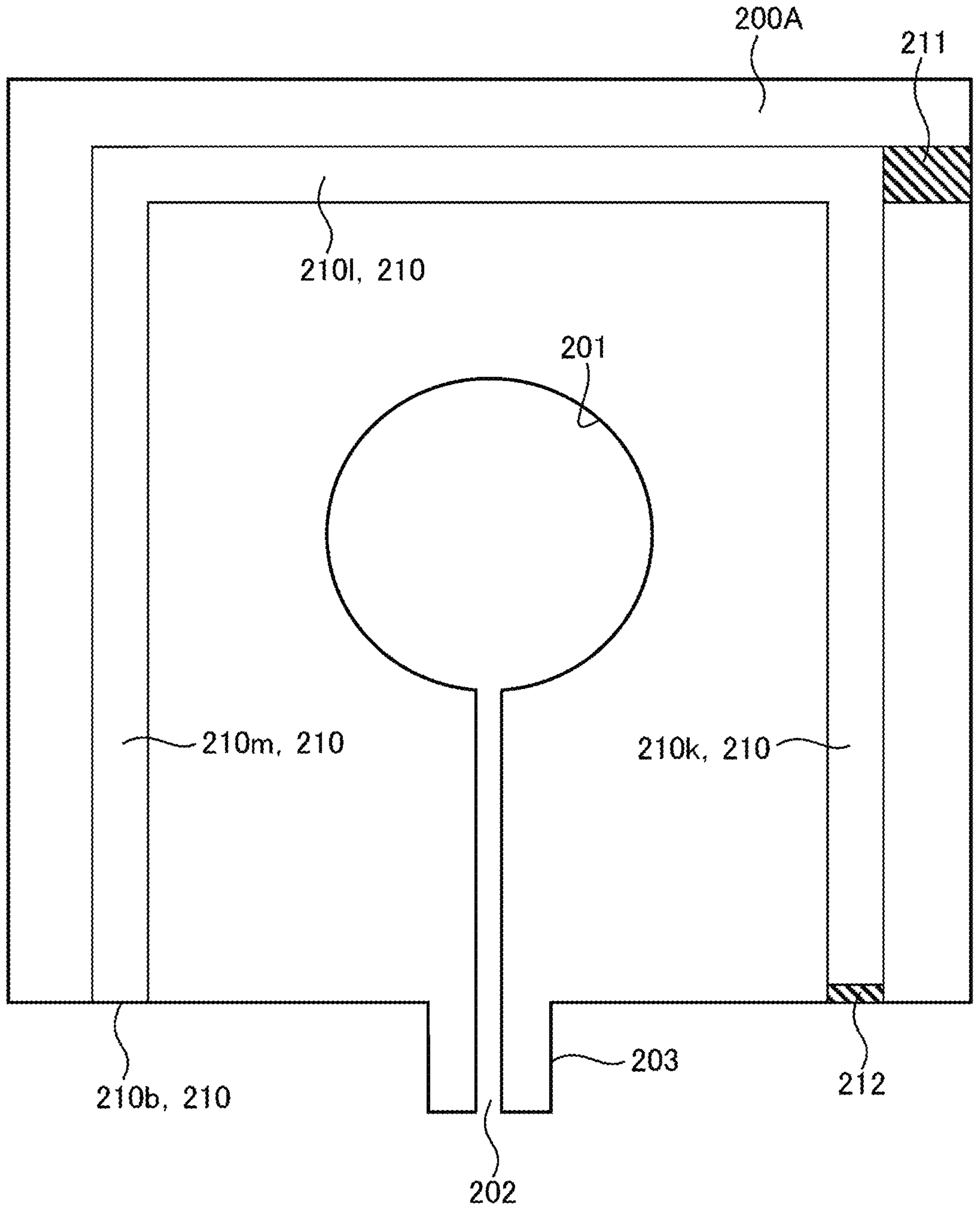
FIG. 7 is a diagram showing the processing formation of the refrigerant flow path of the industrial magnetron according to the second embodiment of the present invention.

FIG. 7 is a diagram showing processing and formation of the refrigerant flow path 210. FIG. 7 exemplifies processing and formation of the lower flow paths 210*k*, 210*l*, and 210*m* among the upper flow paths 210*c*, 210*d*, and 210*e*, the intermediate flow paths 210*g*, 210*h*, and 210*i*, the lower flow paths 210*k*, 210*l*, and 210*m*, and the connecting flow paths 210*f* and 210*j* in FIG. 6.

In the formation of the lower flow paths 210*k*, 210*l*, and 210*m*, first, cutting by a drill is performed from one side surface of the cooling block 200A (the lower flow path 210*m*). At this time, cutting is performed so that the tip of the drill does not penetrate the side surface facing that side surface. Note that the interval between the lower flow paths 210*k*, 210*l*, and 210*m* is appropriately set in consideration of the amount of heat generation of the anode cylindrical body 3 at the design stage.

Next, cutting is similarly performed in a predetermined position (the same height in the vertical direction) on a side surface (orthogonal side surface) adjacent to the corresponding side surface (the lower flow path 210*l*). In this case, the cutting is performed such that the lower flow path 210*l* is connected to the innermost portion of the lower flow path 210*m*. At this point, the lower flow path 210*m* and the lower flow path 210*l* near the inlet are connected.

Next, the lower flow path 210*k* is cut so as to be connected to the deepest portion of the lower flow path 210*l* near the inlet. At this point, the lower flow path 210*l* and the lower flow path 210*k* near the inlet are connected.

Through the above processing, the lower flow paths 210*k*, 210*l*, and 210*m* communicate with each other, thus forming a U-shaped flow path.

Next, the connecting flow path 210*j* (FIG. 6) is formed by cutting using a drill from the lower bottom surface of the cooling block 200A. As a result, the intermediate flow paths 210*g*, 210*h*, and 210*i* and the lower flow paths 210*k*, 210*l*, and 210*m* communicate with each other.

Here, helical groove processing has already been completed by cutting using a similar drill for the upper flow paths 210*c*, 210*d*, and 210*e* and the intermediate flow paths 210*g*, 210*h*, and 210*i*. Incidentally, helical refers to a winding like that of a snail, or a swirling line.

Note that the intervals between the upper flow paths 210*c*, 210*d*, and 210*e*, the intermediate flow paths 210*g*, 210*h*, and 210*i*, and the lower flow paths 210*k*, 210*l*, and 210*m* are appropriately set in consideration of the amount of heat generation and the like of the anode cylindrical body 3 at the design stage.

Finally, termination processing is performed in which openings other than the connection port 210*b* through which the refrigerant is introduced and the connection port (not illustrated) through which the refrigerant is recovered are closed by the closing members 211 and 212. Note that a screw member for embedding the closing members 211 and 212 to appropriate positions is desirably used. Specifically, a sinking plug is desirably used as the closing members 211 and 212, and by using a wound seal tape, liquid leakage can be prevented even in cases where the refrigerant pressure is high, and a highly reliable product can be obtained. By using the sinking plug, it is easy to remove the sinking plug and clean the inside of the flow path in a case where foreign matter or the like stagnates in the flow path of the cooling block 200A and the flow path resistance increases. However, it is also conceivable to fix the closing members 211 and 212 by welding. This is because the welding can more reliably prevent liquid leakage.

Although the above-described processing and assembly method have been described in the case of a three-stage flow path configuration, the same applies to cases of a single-stage flow path configuration, a dual-stage flow path configuration, and also to cases of flow path configurations in four or more stages.

Flow of Refrigerant

Figure 8:
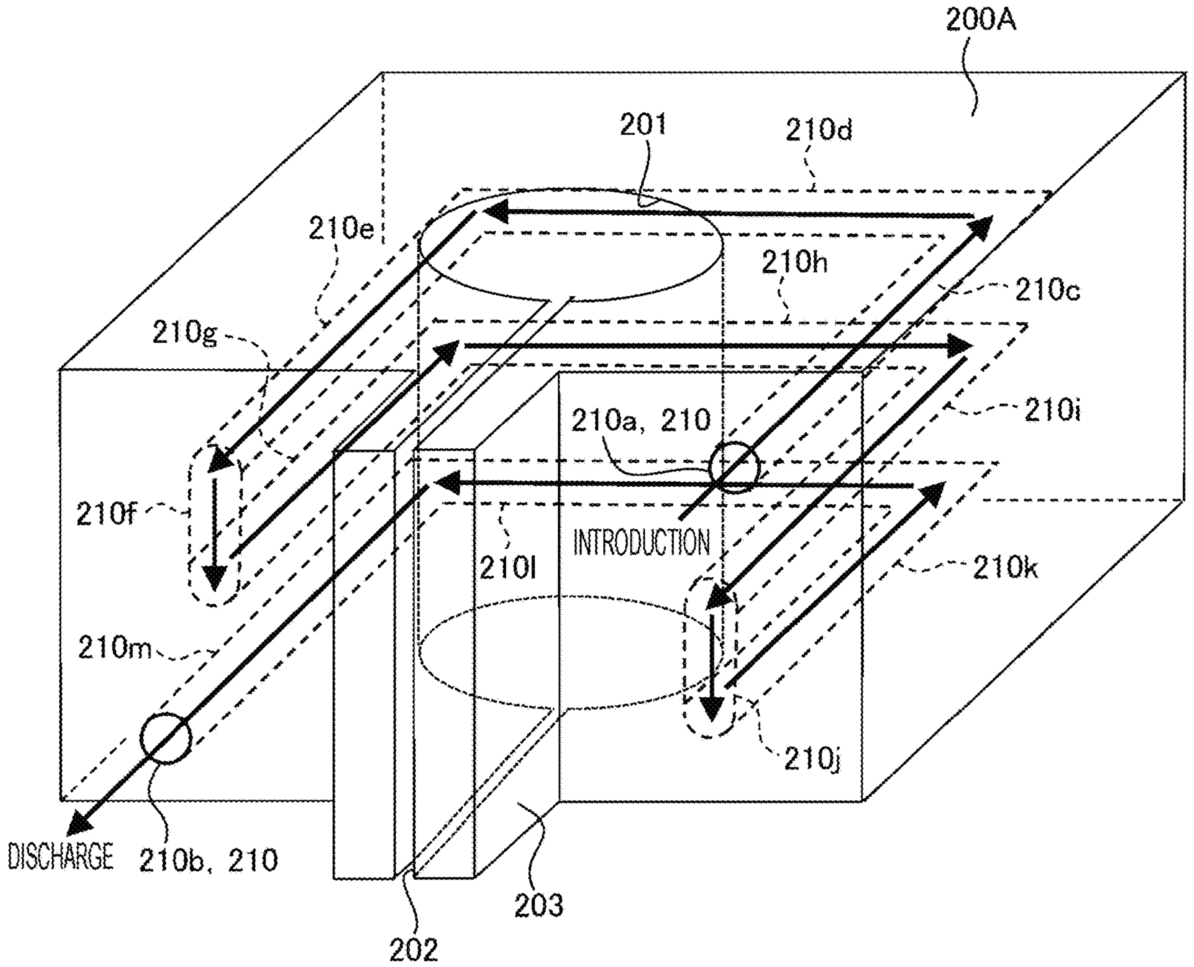
FIG. 8 is a perspective view showing the flow of refrigerant in a cooling block having the three-stage flow path configuration of FIG. 6.

FIG. 8 is a perspective view showing the flow of refrigerant in a cooling block having the three-stage flow path configuration of FIG. 6. A thick arrow in FIG. 8 indicates the flow of the refrigerant.

As shown in FIG. 8, refrigerant introduced from a refrigerant storage tank (not shown) through a refrigerant supply path (not shown) and the connection port 210*a* (introduction port) of the upper flow path 210*c* is transferred to the intermediate flow paths 210*g*, 210*h*, and 210*i* by the connecting flow path 210*f* after the anode cylindrical body 3 (FIG. 5) inside the magnetron body is cooled by the upper flow paths 210*c*, 210*d*, and 210*e*, and the anode cylindrical body 3 is cooled by the intermediate flow paths 210*g*, 210*h*, and 210*i*, and is then transferred to the lower flow paths 210*k*, 210*l*, and 210*m* by the connecting flow path 210*j* such that the anode cylindrical body 3 is cooled by the lower flow paths 210*k*, 210*l*, and 210*m*, whereupon processing to collect the refrigerant in the refrigerant storage tank is performed through the connection port 210*b* (discharge port) of the lower flow path 210*m* and the recovery flow path. This is defined as one cooling treatment, and this cooling treatment is repeated.

The refrigerant is introduced from the connection port 210*a* of the upper flow path 210*c*, passes through the U-shaped upper flow paths 210*c*, 210*d*, and 210*e*, flows into the intermediate flow path 210*g* via the connecting flow path 210*f*, passes through the U-shaped intermediate flow paths 210*g*, 210*h*, and 210*i*, further flows into the lower flow path 210*k* via the connecting flow path 210*j*, passes through the U-shaped lower flow paths 210*k*, 210*l*, and 210*m*, and flows out from the connection port 210*b* of the lower flow path 210*m*.

In FIG. 8, first, the refrigerant, which cools the anode cylindrical body 3 by being circulated by the upper flow paths 210*c*, 210*d*, and 210*e* and is thermally affected by the anode cylindrical body 3 at such time, is transferred to the intermediate flow paths 210*g*, 210*h*, and 210*i* and cools the anode cylindrical body 3 by being circulated by the intermediate flow paths 210*g*, 210*h*, and 210*i* and is further thermally affected by the anode cylindrical body 3 at such time, cools the anode cylindrical body 3 by being circulated by the lower flow paths 210*k*, 210*l*, and 210*m*; therefore, each cooling flow path can be made to circulate under a predetermined discharge pressure.

Adjustment of Refrigerant Capacity of Cooling Block 200A that Includes Refrigerant Flow Paths Circulating a Plurality of Times Basically, by disposing the refrigerant flow path 210 to circulate around the portion of the anode cylindrical body 3 having the largest amount of heat generation, the cooling capacity of the refrigerant flow path 210 relative to the anode cylindrical body 3 can be maximized.

The refrigerant capacity of the cooling block 200A can be adjusted by any of, or a combination of:

(1) the cross-sectional area of the refrigerant flow paths;

(2) the arrangement positions of the refrigerant flow paths;

(3) the number of circuits of the refrigerant flow paths.

In a case where the drill conditions are not changed, the refrigerant capacity can be adjusted by (2) the arrangement positions of the refrigerant flow paths and (3) the number of circuits of the refrigerant flow paths. Hereinafter, descriptions will be provided in order.

FIGS. 9A to 9F are diagrams schematically illustrating arrangement positions of refrigerant flow paths circulating a plurality of times.

Figure 9A:
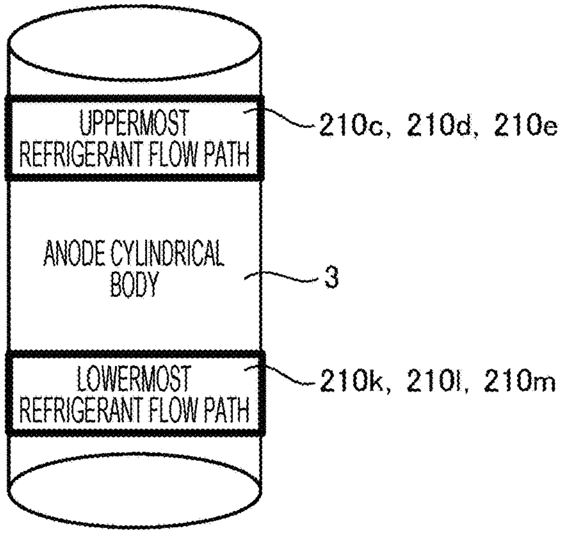
FIG. 9A is a diagram schematically showing an arrangement position of a refrigerant flow path that circulates a plurality of times d the industrial magnetron according to the second embodiment of the present invention.

In FIG. 9A, the maximum heat generation part is distributed to the upper part and the lower part of the anode cylindrical body 3, and the uppermost refrigerant flow paths (for example, the upper flow paths 210*c*, 210*d*, and 210*e* in FIG. 6) and the lowermost refrigerant flow paths (for example, the lower flow paths 210*k*, 210*l*, and 210*m* in FIG. 6) circulate in the upper part and the lower part of the anode cylindrical body 3. In this case, the flow paths have a dual-stage flow path configuration.

Figure 9B:
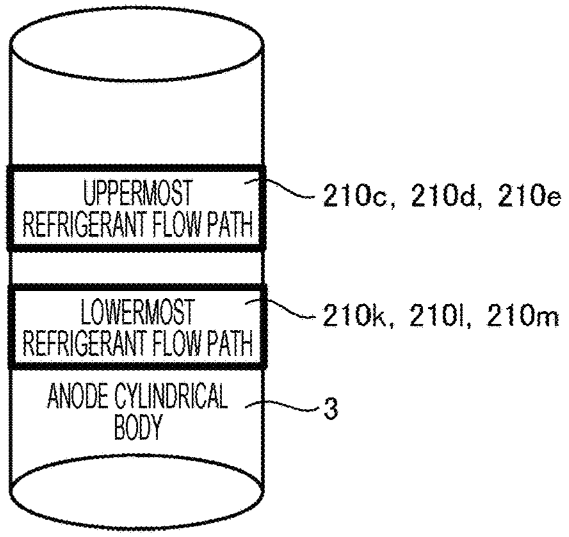
FIG. 9B is a diagram schematically showing an arrangement position of a refrigerant flow path that circulates a plurality of times the industrial magnetron according to the second embodiment of the present invention.

In FIG. 9B, the maximum heat generation part is distributed to the central part of the anode cylindrical body 3, and the uppermost refrigerant flow paths (for example, the upper flow paths 210*c*, 210*d*, and 210*e* in FIG. 6) and the lowermost refrigerant flow paths (for example, the lower flow paths 210*k*, 210*l*, and 210*m* in FIG. 6) are made to circulate in the central part of the anode cylindrical body 3. In this case, the flow paths have a dual-stage flow path configuration.

Figure 9C:
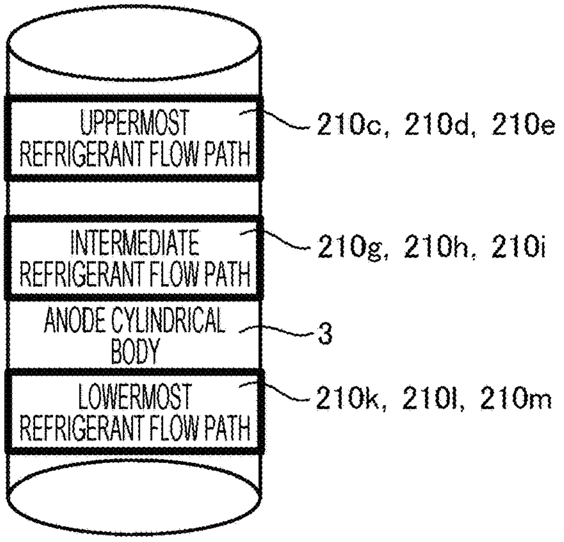
FIG. 9C is a diagram schematically showing an arrangement position of a refrigerant flow path that circulates a plurality of times around the industrial magnetron according to the second embodiment of the present invention.

In FIG. 9C, the maximum heat generation part is distributed to the central part of the anode cylindrical body 3, and is of the high-output type. The anode cylindrical body 3 has a three-stage flow path configuration corresponding to a heat generation amount of a high-output type, and the uppermost refrigerant flow paths (for example, the upper flow paths 210*c*, 210*d*, and 210*e* in FIG. 8), the intermediate refrigerant flow paths (for example, the intermediate flow paths 210*g*, 210*h*, and 210*i* in FIG. 8), and the lowermost refrigerant flow paths (for example, the lower flow paths 210*k*, 210*l*, and 210*m* in FIG. 8) are made to circulate in the central part of the anode cylindrical body 3.

Figure 9D:
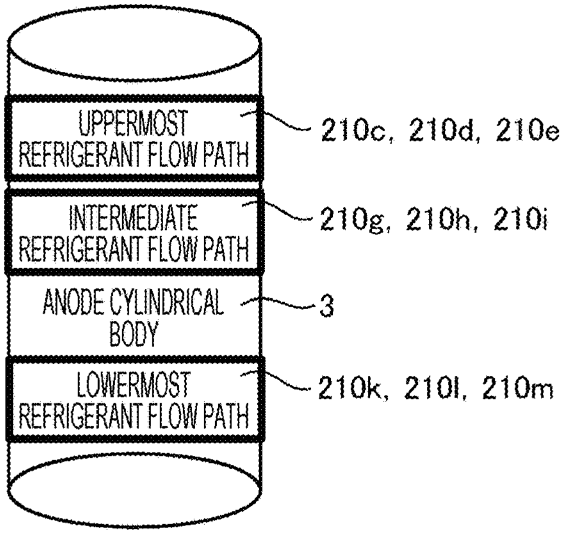
FIG. 9D is a diagram schematically showing an arrangement position of a refrigerant flow path that circulates a plurality of times around the industrial magnetron according to the second embodiment of the present invention.

In FIG. 9D, the maximum heat generation part is distributed to the upper part of the anode cylindrical body 3, and is of the high-output type. The anode cylindrical body 3 has a three-stage flow path configuration corresponding to a heat generation amount of a high-output type. The intermediate refrigerant flow paths (for example, the intermediate flow paths 210*g*, 210*h*, and 210*i* in FIG. 6) are arranged close to the uppermost refrigerant flow paths (for example, the upper flow paths 210*c*, 210*d*, and 210*e* in FIG. 6), and the uppermost refrigerant flow paths (for example, the upper flow paths 210*c*, 210*d*, and 210*e* in FIG. 6), the intermediate refrigerant flow paths (for example, the intermediate flow paths 210*g*, 210*h*, and 210*i* in FIG. 6), and the lowermost refrigerant flow paths (for example, the lower flow paths 210*k*, 210*l*, and 210*m* in FIG. 6) circulate around the anode cylindrical body 3.

Figure 9E:
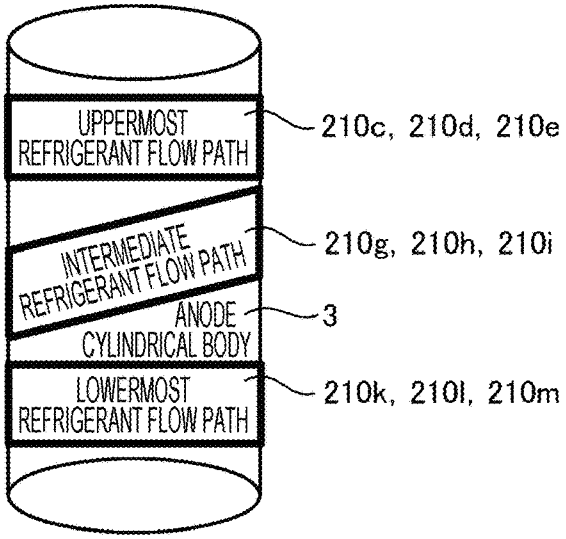
FIG. 9E is a diagram schematically showing an arrangement position of a refrigerant flow path that circulates a plurality of times around the industrial magnetron according to the second embodiment of the present invention.

FIG. 9E illustrates a three-stage flow path configuration corresponding to a heat generation amount of a high-output type. The difference from FIG. 9C is that the intermediate flow paths 210*g*, 210*h*, and 210*i* in FIG. 9E circulate obliquely around the central part of the anode cylindrical body 3. In the formation of the intermediate flow paths 210*g*, 210*h*, and 210*i* in FIG. 9E, cutting using a tapping drill is performed in an oblique direction from one side surface of the cooling block 200A. Accordingly, the intermediate flow paths 210*g*, 210*h*, and 210*i* in FIG. 9E are connected to each other while circulating around the anode cylindrical body 3 in a helical manner, between the uppermost refrigerant flow paths (for example, the upper flow paths 210*c*, 210*d*, and 210*e* in FIG. 6) and the lowermost refrigerant flow paths (for example, the lower flow paths 210*k*, 210*l*, and 210*m* in FIG. 6). In addition, flow paths having an interior subjected to helical groove processing are connected to each other while circulating around the anode cylindrical body 3 in a helical manner.

By adopting a configuration in which the intermediate flow paths 210*g*, 210*h*, and 210*i* are obliquely circulated, it is possible to cope with a heat generation amount of a high-output type without increasing the number of stages of the refrigerant flow paths.

Figure 9F:
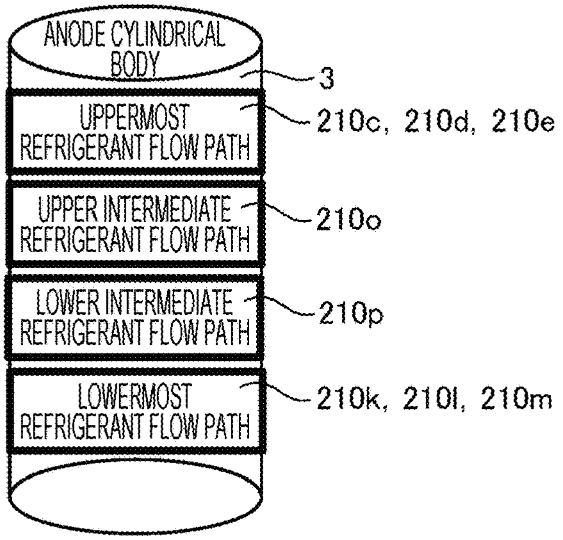
FIG. 9F is a diagram schematically showing an arrangement position of a refrigerant flow path that circulates a plurality of times d the industrial magnetron according to the second embodiment of the present invention.

FIG. 9F illustrates a four-stage flow path configuration corresponding to a heat generation amount of a high-output type. Intermediate refrigerant flow paths are provided in two stages, that is, an upper intermediate refrigerant flow path 210*o* and a lower intermediate refrigerant flow path 210*p*. The uppermost refrigerant flow paths (for example, the upper flow paths 210*c*, 210*d*, and 210*e* in FIG. 6), the upper intermediate refrigerant flow path 210*o*, the lower intermediate refrigerant flow path 210*p*, and the lowermost refrigerant flow paths (for example, the lower flow paths 210*k*, 210*l*, and 210*m* in FIG. 6) circulate around the anode cylindrical body 3.

Advantageous Effects of Second Embodiment

In the industrial magnetron 100 (FIG. 5) according to the second embodiment, the cooling block 200A (FIG. 6) contains two or more refrigerant flow paths 210 through which the refrigerant is made to flow, in different positions in a vertical direction, and the capacity for cooling the anode cylindrical body 3 is adjusted by the positions where the refrigerant flow paths 210 are arranged and/or the number of circuits of the refrigerant flow paths 210.

In addition, similarly to the first embodiment, at the stage of manufacturing a sample, which is the stage prior to main production of the industrial magnetron 100, the industrial magnetron 100 is subjected to a test operation to specify a heat generation position of the anode cylindrical body 3 and measure the amount of heat generation thereof, and the arrangement positions of the refrigerant flow paths 210 and the number of circuits of the refrigerant flow paths 210 are set according to the heat generation position and the amount of heat generation.

As described above, the cooling block 200A includes two or more refrigerant flow paths 210, thus enabling sufficient cooling of the anode cylindrical body 3 even when the heat generation amount of thereof increases, thereby suppressing performance degradation and failure of the anode cylindrical body 3. As a result, it is possible to provide an industrial magnetron in which the influence of heat generation is suppressed even when the industrial magnetron is operated in a high-output range of 2 kW to 15 kW.

The cooling block 200A is capable of handling the amount of heat generation while suppressing the number of stages of the refrigerant flow paths by devising the arrangement positions of the refrigerant flow paths 210. In a case where the number of stages of the refrigerant flow paths is small, the configuration of the cooling block is simplified, and a reduction in manufacturing costs and maintenance can be expected.

Furthermore, irrespective of the output of an industrial magnetron, at the stage of manufacturing a sample, which is the stage prior to main production of the industrial magnetron 100, the industrial magnetron 100 is subjected to a test operation to specify the heat generation position of the anode cylindrical body 3, measure the amount of heat generation, and the arrangement positions of the refrigerant flow paths 210 and the number of circuits of the refrigerant flow paths 210 are set according to the heat generation position and the amount of heat generation thereof, and therefore the industrial magnetron 100 is capable of handling even changes in output, changes in application conditions or replacement (exchange) in the future, and thus versatility can be remarkably improved.

In the industrial magnetron 100 according to the second embodiment (FIG. 5), the cooling block 200A contains two or more refrigerant flow paths 210 through which the refrigerant is made to flow, in different positions in a vertical direction, and the two or more refrigerant flow paths 210 are connected to each other by connecting flow paths 210*f*, 210*j*, which each have a helical groove 220 on an inner wall surface thereof.

Thus, the two or more refrigerant flow paths 210 and the connecting flow paths 210*f* and 210*j* are both formed by cutting with a drill. Two or more refrigerant flow paths 210 are connected in series by the connecting flow paths 210*f* and 210*j*, and can constitute one flow path. Note that, from a manufacturing standpoint, the refrigerant flow paths and the connecting flow paths are desirably orthogonal to each other.

In the industrial magnetron 100 (FIG. 5) according to the second embodiment, the cooling block 200A has two or more refrigerant flow paths 210 through which the refrigerant is made to flow, in different positions in the vertical direction, and in a case where the uppermost refrigerant flow path in the vertical direction among the two or more refrigerant flow paths 210 is referred to as the upper flow path, and the lowermost refrigerant flow path in the vertical direction is referred to as the lower flow path, connection ports 210*a*, 210*b* are provided at one end of each of the upper flow path and the lower flow path, and the refrigerant is introduced from the connection port 210*a* of the upper flow path and the refrigerant is discharged from the connection port 210*b* of the lower flow path, or the refrigerant is introduced from the connection port 210*b* of the lower flow path and the refrigerant is discharged from the connection port 210*a* of the upper flow path.

Thus, the refrigerant supply path (not illustrated) and the refrigerant storage tank (not illustrated) can be connected to the connection ports 210*a* and 210*b*. For example, a refrigerant supplied from the refrigerant storage tank (not shown) via the refrigerant supply path (not shown) can be introduced into the connection port 210*a* (introduction port). The refrigerant can be collected in the refrigerant storage tank through the connection port 210*b* (discharge port) and the refrigerant collection flow path.

In the industrial magnetron 100 according to the second embodiment (FIG. 5), the cooling block 200A includes intermediate flow paths (for example, the intermediate flow paths 210*g*, 210*h*, and 210*i* in FIG. 8) arranged in an intermediate position in the vertical direction between the upper flow paths and the lower flow paths, and adjusts the capacity for cooling the anode cylindrical body 3 according to the positions where the intermediate flow paths are arranged and/or the number of intermediate flow paths installed.

Thus, by providing the intermediate flow paths, one set of flow paths including three or more stages of refrigerant flow paths can be configured (see FIG. 9C, for example). In addition, because the intermediate flow paths are provided, for example, as illustrated in FIGS. 9C to 9F, the degree of freedom due to the arrangement positions of the intermediate flow paths with respect to the heat generation part is increased. By making the intermediate flow paths correspond to the heat generation part, it is possible to handle the amount of heat generation while suppressing the number of stages of the refrigerant flow paths. As a result, even when the amount of heat generation of the anode cylindrical body 3 increases, the anode cylindrical body can be sufficiently cooled to suppress performance degradation and failure of the anode cylindrical body.

In the industrial magnetron 100 (FIG. 5) according to the second embodiment, in a case where the intermediate flow path located in the upper part in the vertical direction is referred to as the upper intermediate flow path, and the intermediate flow path located in the lower part in the vertical direction is referred to as the lower intermediate flow path, the upper intermediate flow path and the lower intermediate flow path are arranged in displaced positions relative to each other so as not to be directly connected, and are connected by the connecting flow paths 210*f* and 210*j* after circulating around the anode cylindrical body 3.

Thus, the upper intermediate flow path and the lower intermediate flow path are arranged in displaced positions relative to each other so as not to be directly connected to each other, and thus, when the refrigerant, which has been thermally affected by the anode cylindrical body 3, is transferred to the intermediate flow paths, the refrigerant can circulate all around the anode cylindrical body so as to cool same, thereby enhancing the cooling effect.

Furthermore, in the industrial magnetron 100 (FIG. 5) according to the second embodiment, the intermediate flow path may be an oblique flow path connected between the upper flow path and the lower flow path while circulating around the anode cylindrical body 3 in a helical manner. Thus, for example, as illustrated in FIG. 9E, the intermediate flow path can be made to correspond to the heat generation part, and it is possible to handle the amount of heat generation while suppressing the number of stages of the refrigerant flow paths.

In the industrial magnetron 100 according to the second embodiment (FIG. 5), the columnar shape of the cooling block 200A is a quadrangular column, the upper flow path, the lower flow path, and the intermediate flow path are formed in a U-shape from a predetermined surface of the quadrangular column to circulate around the anode cylindrical body 3, and the upper flow path and the lower flow path are each closed at different ends from those of the connection ports 210*a*, 210*b*, and both ends of the intermediate flow path are closed.

Thus, because the columnar shape of the cooling block is a quadrangular column, manufacturing including processing such as drilling is straightforward. The quadrangular column has high affinity in a case where the refrigerant flow paths are formed in a U-shape. Furthermore, the U-shaped refrigerant flow path is also easily subjected to helical groove processing by cutting using a tapping drill. In light of the foregoing configurations, manufacturing costs can be reduced.

Third Embodiment

Figure 10:
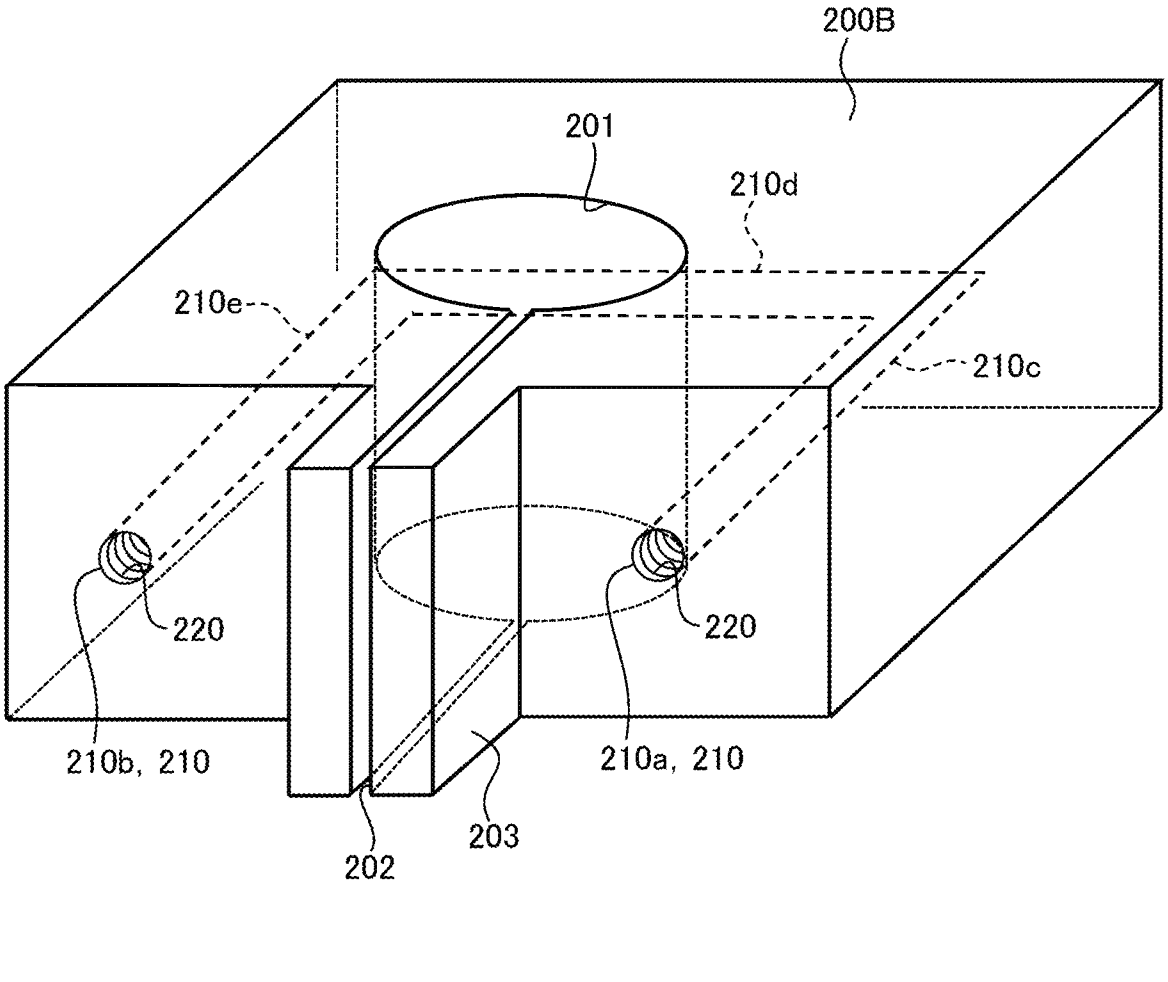
FIG. 10 is a perspective view showing a structure of a cooling block of an industrial magnetron according to a third embodiment of the present invention.

FIG. 10 is a perspective view showing a structure of cooling block 200B of the industrial magnetron according to a third embodiment of the present invention. The same components as those in FIG. 2 are denoted by the same reference signs, and a description of duplicate parts is omitted.

The cooling block 200B of the industrial magnetron 100 shown in FIG. 10 includes a refrigerant flow path 210 that that makes one circuit of the anode cylindrical body 3.

The refrigerant flow path 210 of the cooling block 200B is a cylindrical flow path having the helical groove 220 on the inner wall surface thereof.

The industrial magnetron 100 has a large output and a large amount of heat generation from the anode cylindrical body, and hence it is necessary to enhance the cooling effect afforded by the cooling block 200. In order to enhance a cooling effect, the helical groove 220 is provided on the inner wall surface of the refrigerant flow paths 210.

The refrigerant flow paths 210 having the helical groove 220 have two advantages that the refrigerant contact surface area serving as a refrigerant supply path is larger than that of a refrigerant flow path having no helical groove, and that a stagnation time of the refrigerant is longer. Therefore, the refrigerant flow path 210 having the helical groove 220 enables the cooling capacity to be increased even if the supply amount of the refrigerant per unit time is the same.

Note that, hereinafter, the refrigerant flow path 210 having the helical groove 220 on the inner wall surface thereof is simply referred to as a refrigerant flow path, and a refrigerant flow path having no helical groove on the inner wall surface thereof is referred to as a conventional refrigerant flow path.

Figure 11:
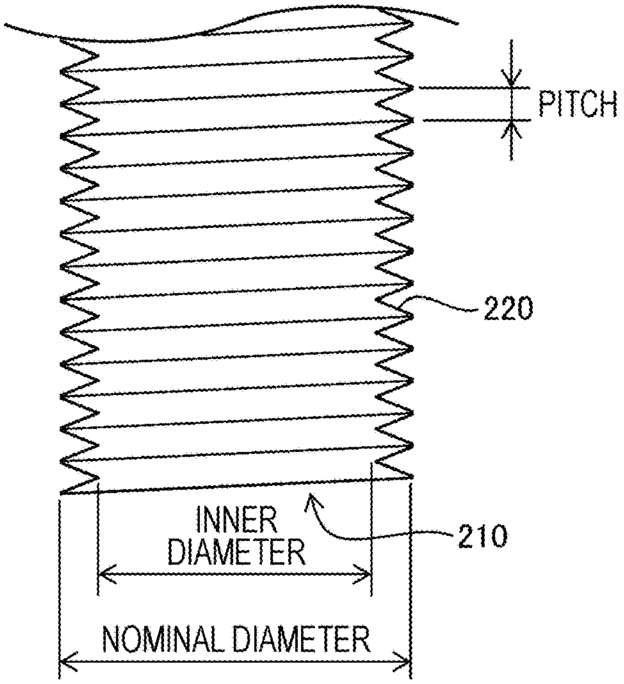
FIG. 11 is a diagram illustrating a structure of a refrigerant flow path having a helical groove on an inner wall surface of the industrial magnetron according to the third embodiment of the present invention.

FIG. 11 is a diagram illustrating a structure of a refrigerant flow path 210 having a helical groove 220 on an inner wall surface thereof.

As illustrated in FIG. 11, the helical groove 220 includes a predetermined pitch, an inner diameter, and a nominal diameter. The pitch, the inner diameter, and the size of the nominal diameter of the helical groove are set at the stage of manufacturing a sample, which is the stage prior to main production of the industrial magnetron 100, by subjecting the industrial magnetron 100 to a test operation to specify the heat generation position of the anode cylindrical body 3 and measure the amount of heat generation thereof, according to the heat generation position and the amount of heat generation.

A refrigerant flow path 210 having a helical groove 220 illustrated in FIG. 11 is disposed in the cooling block 200B (FIG. 10).

For the helical groove 220, in manufacturing and processing, the refrigerant flow path 210 is cut using a drill to form a cylindrical hole, and helical groove processing is further performed using a tapping drill (a helical groove processing drill). Alternatively, the helical groove may be opened directly using a tapping drill.

Figure 12A:
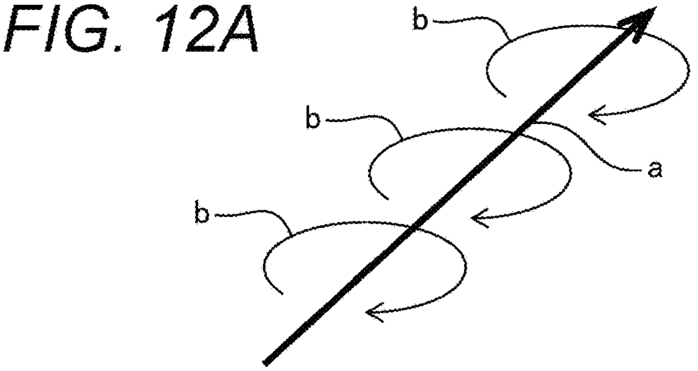
FIG. 12A is a diagram illustrating the flow of a liquid medium in a refrigerant flow path of the industrial magnetron according to the third embodiment of the present invention.
Figure 12B:
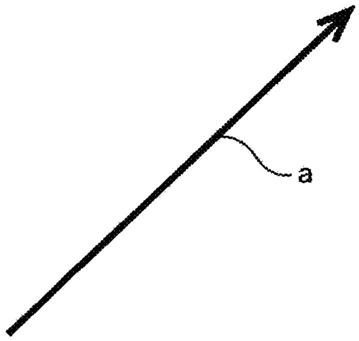
FIG. 12B is a diagram illustrating the flow of a liquid medium in a refrigerant flow path of the industrial magnetron according to the third embodiment of the present invention.

FIGS. 12A and 12B are diagrams to illustrate the flow of a liquid medium in a refrigerant flow path. FIG. 12A illustrates the flow of the liquid medium in the refrigerant flow path 210, and FIG. 12B illustrates the flow of the liquid medium in a conventional refrigerant flow path.

As shown in FIG. 12A, in the case of the refrigerant flow path 210, the liquid medium flows linearly (arrow a in FIG. 12A) and flows while helically rotating (swirling) (arrow b in FIG. 12A).

On the other hand, as shown in FIG. 12B, in the case of the conventional refrigerant flow path, the liquid medium flows linearly (arrow a in FIG. 12B).

As described above, in the refrigerant flow path 210 according to the present embodiment, the liquid medium is subjected to a circulating movement while swirling along the helical groove 220. Because the liquid medium flows while swirling along the helical groove 220, the stagnation time of the refrigerant becomes long, and the cooling capacity can be increased even if the supply amount of the refrigerant per unit time is the same.

Comparison Between Refrigerant Flow Path 210 and Conventional Refrigerant Flow Path In a conventional refrigerant flow path, in a case where drill cutting is performed, the refrigerant flow path has a circular cross-section, and the effect is small from the viewpoint of the heat transfer surface area.

In contrast, the refrigerant flow path 210 has a circular cross-section as per the conventional refrigerant flow path, but the helical groove 220 enables an increase in the refrigerant contact surface area. In other words, the refrigerant contact surface area can be increased without increasing the cross-sectional area of the refrigerant flow path. In addition, because the supplied refrigerant flows while swirling along the helical groove 220, the stagnation time of the refrigerant becomes long. As a result, the cooling capacity of the refrigerant flow path 210 can be increased even if the supply amount of the refrigerant per unit time is the same.

As another method for enhancing the cooling effect afforded by the cooling block 200B, it is conceivable to further increase the cross-sectional area of the refrigerant flow path to increase the refrigerant flow rate per unit time, and to increase the number of refrigerant flow paths in the flow path having the same cross-sectional area to increase the heat transfer surface area as per the second embodiment.

As described above, in the present embodiment, because the refrigerant contact surface area can be increased by the helical groove 220, the refrigerant flow rate per unit time can be further increased even if the cross-sectional area is the same as that of the conventional refrigerant flow path. That is, an effect similar to that obtained by increasing the cross-sectional area of the refrigerant flow path can be obtained without increasing the cross-sectional area of the refrigerant flow path.

In addition, because the heat transfer surface area can be increased by enlarging the refrigerant contact surface, the number of refrigerant flow paths is not increased, or fewer refrigerant flow paths can be used.

In a case where the number of refrigerant flow paths is increased, the refrigerant flow rate per unit time per flow path does not change, but the heat transfer surface area increases in proportion to the number of flow paths. Furthermore, the surface area directly facing the refrigerant flowing in a position close to the anode cylindrical body 3 is increased, and hence the cooling effect can be enhanced.

Advantageous Effects of Third Embodiment

The cooling block 200B of the industrial magnetron 100 according to the third embodiment includes a refrigerant flow path 210 having the helical groove 220 on the inner wall surface thereof.

This configuration is advantageous in that the refrigerant flow paths 210 having the helical groove 220 have a larger refrigerant contact surface area serving as a refrigerant supply path and a longer refrigerant stagnation time than a conventional refrigerant flow path having no helical groove. For this reason, even if the supply amount of the refrigerant per unit time is the same, the cooling capacity can be increased. Therefore, even when the amount of heat generation of the anode cylindrical body 3 increases, the anode cylindrical body can be sufficiently cooled to suppress performance degradation and failure of the anode cylindrical body. As a result, it is possible to provide an industrial magnetron in which the influence of heat generation is suppressed even when the industrial magnetron is operated in a high-output range of 2 kW to 15 kW.

Note that the present invention is not limited to the configurations described in the above embodiments, and the configurations can be appropriately changed without departing from the gist of the present invention set forth in the claims.

For example, the arrangement positions, the number of stages, and the shape of the refrigerant flow paths and the position of the connection port, and so forth are merely examples, and any configuration may be applied.

The above-described embodiments have been described in detail to facilitate understanding of the present invention, and are not necessarily limited to those having all the described configurations. Further, part of the configuration of one embodiment can be replaced with the configuration of another embodiment, and the configuration of another embodiment can also be added to the configuration of the one embodiment. Moreover, it is possible to add, eliminate, or substitute other configurations for part of the configuration of each embodiment.

REFERENCE SIGNS LIST

1 cathode filament
2 anode vane
3 anode cylindrical body
3*a* side wall surface of anode cylindrical body
4*a*, 4*b* permanent magnet
5*a*, 5*b* magnetic pole
6 yoke
7 antenna lead
8 exhaust pipe
9 choke portion
10 antenna cover
40*a*, 40*b* outer wall surface of permanent magnet
40*a*1, 40*b*1 outer circumferential surface where permanent magnet is in contact with permanent magnet contact portion of cooling block
40*a*2, 40*b*2 opposing surface where permanent magnet is in contact with permanent magnet contact portion of cooling block
100 industrial magnetron
200, 200A, 200B cooling block
200*a* outer wall portion of cooling block
200*b* inner wall surface of cooling block
200*c* anode cylindrical body contact portion of cooling block
200*d* permanent magnet contact portion of cooling block
201 anode cylindrical body insertion portion
202 slit
210 refrigerant flow path
210*c*, 210*d*, 210*e* upper flow path
210*g*, 210*h*, 210*i*, 210*o*, 210*p* intermediate flow path
210*c*, 210*d*, 210*e* lower flow path
210*f*, 210*j* connecting flow path
210*a*, 210*b* connection port
211, 212 closing member

The invention claimed is:

1. A method for manufacturing an industrial magnetron, the industrial magnetron comprising:
- an anode cylindrical body;
- an annular permanent magnet that is disposed above and below the anode cylindrical body and that supplies a magnetic field; and
- a cooling block that is disposed in a columnar shape on an outer circumference of the anode cylindrical body, wherein
- the cooling block has an anode cylindrical body contact portion that is in contact with the anode cylindrical body, and a permanent magnet contact portion that is in contact with the permanent magnet, and
- at the stage of manufacturing a sample, which is the stage prior to main production of the industrial magnetron in which both the anode cylindrical body and the permanent magnet are cooled by one cooling block, the industrial magnetron is subjected to a test operation to specify a heat generation position of the anode cylindrical body and measure an amount of heat generation thereof, and an arrangement position of a refrigerant flow path and a number of circuits of the refrigerant flow path are determined according to the heat generation position and the amount of heat generation.

2. The method for manufacturing an industrial magnetron according to claim 1, wherein the cooling block has an inner wall surface that is in close contact with a side wall surface of the anode cylindrical body and that is in contact with an outer wall surface of the permanent magnet.

3. The method for manufacturing an industrial magnetron according to claim 1, wherein the cooling block is provided with a refrigerant flow path that causes a liquid refrigerant to flow so as to circulate around the anode cylindrical body to directly cool the anode cylindrical body.

4. The method for manufacturing an industrial magnetron according to claim 3, wherein
- the cooling block has the refrigerant flow path, which makes at least one circuit of the anode cylindrical body, and
- the capacity for cooling the anode cylindrical body is adjusted by the position in which the refrigerant flow path circulates.

5. The method for manufacturing an industrial magnetron according to claim 3, wherein
- the cooling block contains two or more refrigerant flow paths through which the refrigerant flows, in different positions in a vertical direction, and
- the capacity for cooling the anode cylindrical body is adjusted by the arrangement positions of the refrigerant flow paths and/or the number of circuits of the refrigerant flow paths.

6. The method for manufacturing an industrial magnetron according to claim 3, wherein
- the cooling block contains two or more refrigerant flow paths through which the refrigerant flows, in different positions in a vertical direction, and
- the two or more refrigerant flow paths are connected to each other by a connecting flow path.

7. The method for manufacturing an industrial magnetron according to claim 6, wherein
- the cooling block contains two or more refrigerant flow paths through which the refrigerant flows, in different positions in a vertical direction, and
- in a case where an uppermost refrigerant flow path in the vertical direction among the two or more refrigerant flow paths is referred to as the upper flow path, and a lowermost refrigerant flow path in the vertical direction is referred to as the lower flow path, a connection port is provided at one end of each of the upper flow path and the lower flow path, and
- the refrigerant is introduced from the connection port of the upper flow path and the refrigerant is discharged from the connection port of the lower flow path, or the refrigerant is introduced from the connection port of the lower flow path and the refrigerant is discharged from the connection port of the upper flow path.

8. The method for manufacturing an industrial magnetron according to claim 7, wherein
- the cooling block comprises an intermediate flow path arranged in an intermediate position in the vertical direction between the upper flow path and the lower flow path, and
- the capacity for cooling the anode cylindrical body is adjusted according to the position where the intermediate flow path is arranged and/or a number of intermediate flow paths installed.

9. The method for manufacturing an industrial magnetron according to claim 8, wherein, in a case where the intermediate flow path located in the upper part in the vertical direction is referred to as the upper intermediate flow path, and the intermediate flow path located in the lower part in the vertical direction is referred to as the lower intermediate flow path, the upper intermediate flow path and the lower intermediate flow path are arranged in displaced positions relative to each other so as not to be directly connected, and are connected by the connecting flow path after circulating around the anode cylindrical body.

10. The method for manufacturing an industrial magnetron according to claim 8, wherein the columnar shape of the cooling block is a quadrangular column, the upper stage flow path, the lower stage flow path, and the intermediate flow path are formed in a U-shape from a predetermined surface of the quadrangular column to circulate around the anode cylindrical body, the upper flow path and the lower flow path are each closed at different ends from those of the connection port, and both ends of the intermediate flow path are closed.

11. The method for manufacturing an industrial magnetron according to claim 3, wherein the refrigerant flow path has a helical groove on an inner wall surface thereof.

* * * * *